United States Patent
Ogawa et al.

(10) Patent No.: US 7,923,885 B2
(45) Date of Patent: Apr. 12, 2011

(54) STATOR FOR ROTARY ELECTRIC MACHINE, AND ROTARY ELECTRIC MACHINE USING THE STATOR

(75) Inventors: Shinichi Ogawa, Oobu (JP); Shinji Kouda, Kariya (JP); Akiya Shichijoh, Yatomi (JP); Takeo Maekawa, Okazaki (JP)

(73) Assignee: Denso Corporation, Kariya (JP)

( * ) Notice: Subject to any disclaimer, the term of this patent is extended or adjusted under 35 U.S.C. 154(b) by 37 days.

(21) Appl. No.: 12/323,836

(22) Filed: Nov. 26, 2008

(65) Prior Publication Data

US 2009/0140594 A1 Jun. 4, 2009

(30) Foreign Application Priority Data

Nov. 26, 2007 (JP) ................................. 2007-305116
Sep. 5, 2008 (JP) ................................. 2008-228633

(51) Int. Cl.
H02K 3/28 (2006.01)
(52) U.S. Cl. ........................................ 310/207; 310/184
(58) Field of Classification Search .................. 310/180, 310/184, 201, 203, 206–207
See application file for complete search history.

(56) References Cited

U.S. PATENT DOCUMENTS

| | | | |
|---|---|---|---|
| 5,936,326 A | 8/1999 | Umeda et al. | |
| 6,140,735 A | 10/2000 | Kato et al. | |
| 6,794,785 B2 * | 9/2004 | Isogai et al. | 310/184 |
| 6,911,758 B2 | 6/2005 | Oohashi | |
| 6,943,477 B1 | 9/2005 | Nakamura | |
| 6,979,926 B2 * | 12/2005 | Ogawa et al. | 310/180 |
| 7,337,525 B2 | 3/2008 | Ueda et al. | |
| 2001/0019234 A1 | 9/2001 | Murakami et al. | |
| 2004/0207282 A1 | 10/2004 | Ueda et al. | |
| 2007/0022596 A1 | 2/2007 | Nishimura et al. | |
| 2007/0273237 A1 | 11/2007 | Shichijoh et al. | |
| 2008/0079328 A1 | 4/2008 | Shichijoh et al. | |

FOREIGN PATENT DOCUMENTS

| | | |
|---|---|---|
| EP | 1 376 821 | 1/2004 |
| JP | 11-285216 | 10/1999 |
| JP | 2000-139048 | 5/2000 |
| JP | 2000-139051 | 5/2000 |
| JP | 2002 176752 | 6/2002 |
| JP | 2003 018778 | 1/2003 |

(Continued)

OTHER PUBLICATIONS

Japanese Office Action dated Nov. 10, 2009, issued in corresponding Japanese Application No. 2008-228633, with English translation.

(Continued)

*Primary Examiner* — Tran N Nguyen
(74) *Attorney, Agent, or Firm* — Nixon & Vanderhye PC

(57) ABSTRACT

A stator for a multiple-phase rotary electric machine provided a stator core with slots and a coil formed of a plurality of windings for individual phases. Each winding has slot-accommodated portions held in different slots, turn portions connecting the slot-accommodated portions outside of the slots in an axial direction, and a return portion that connects two of the turn portions and changes a winding direction of the winding at given slots. The turn portions include specific turn portions which are the same in a circumferential position as the turn portion connected to the one of the return portion. The specific turn portions are located, in a radial direction, to be drawn apart from the rotor than the slot-accommodated portions connected to the specific turn portions.

21 Claims, 19 Drawing Sheets

FOREIGN PATENT DOCUMENTS

| | | |
|---|---|---|
| JP | 2004 088993 | 3/2004 |
| JP | 2004 320886 | 11/2004 |
| JP | 2004 350381 | 12/2004 |
| JP | 2007 037313 | 2/2007 |
| JP | 2007 318902 | 12/2007 |
| JP | 2008 113539 | 5/2008 |
| WO | WO 2008/108351 | 9/2008 |

OTHER PUBLICATIONS

Extended European Search Report dated Sep. 24, 2010, issued in corresponding European Application No. 08020505.7-1528.

Chinese Office Action dated Nov. 12, 2010, issued in corresponding Chinese Application No. 200810190828.2, with English translation.

* cited by examiner

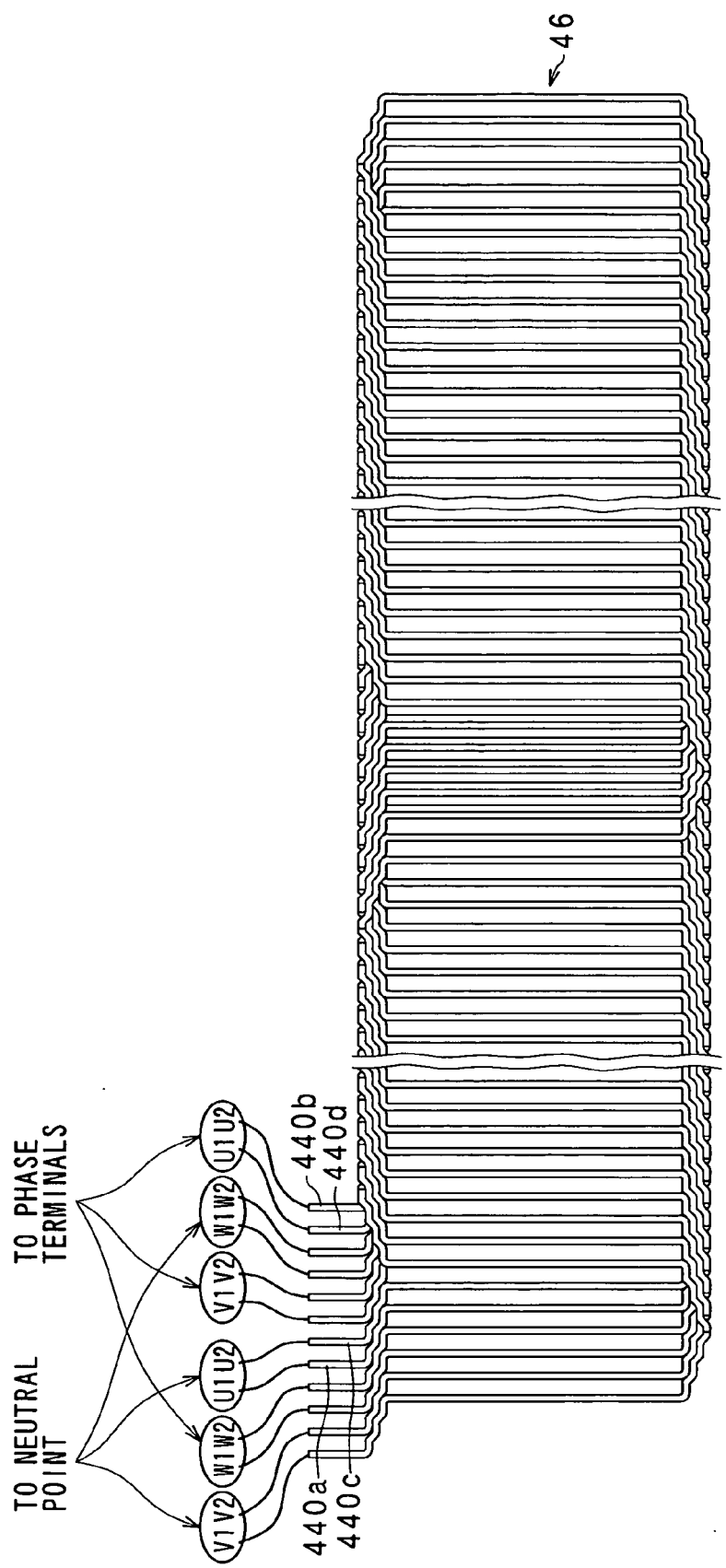

STATOR FOR ROTARY ELECTRIC MACHINE, AND ROTARY ELECTRIC MACHINE USING THE STATOR

CROSS-REFERENCE TO RELATED APPLICATION

This application is based on and claims the benefit of priority from earlier Japanese Patent Applications No. 2007-305116 and No. 2008-228633 filed Nov. 26, 2007 and Sep. 5, 2008, respectively, the description of which is incorporated herein by reference.

BACKGROUND OF THE INVENTION

1. Technical field of the Invention

The present invention relates to a stator for rotary electric machine, and a rotary electric machine using the stator.

2. Related Art

Recently, there has been a demand for downsized and high-power rotary electric machines for use as electric motors or electric generators.

For example, in the case of rotary electric machines loaded on vehicles, the space for loading such a rotary electric machine has been more and more reduced, while the output thereof has been demanded to be more and more enhanced.

Various types of rotary electric machines have been in use. Some of such conventional rotary electric machines are disclosed in Japanese Patent Laid-Open Publication Nos. 2002-176752 and 2004-320886, for example.

Each of these references discloses a stator for rotary electric machine. The stator for rotary electric machine disclosed in each of these literatures has a coil formed of continuous windings.

In the rotary electric machines described in these references, three-phase stator winding is formed using twelve element wires. Accordingly, the stator is structured to have twenty-four element wire ends axially projected from the stator. Thus, when these element wire ends are connected, an extra space is required in the axial direction of the stator, raising a problem of increasing the size of the stator in the axial direction.

SUMMARY OF THE INVENTION

The present invention has been made in light of the circumstances explained above, and has an object of providing a downsized stator, which will not deteriorate its performance when used for a rotary electric machine, and of providing a rotary electric machine using the stator.

In a first aspect of the inventive stator for rotary electric machine, of the turn portions connected to the return portions of the windings configuring the coil, those turn portions which are located at the same circumferential position on one side are connected to the respective slot-accommodated portions by way of the positions drawn apart from the rotor to avoid interference between the turn portions. As a result, no interference is caused between the coil and the rotor to thereby suppress deterioration in the performance of the rotary electric machine using the stator.

In the stator of the rotary electric machine of the present invention, the coil is formed into a wavy shape by winding the winding member each having the return portion. Thus, the number of ends of the windings projected from the axial end face of the coil is reduced. In other words, only one end of each of the windings is externally projected for connection between the individual phases to reduce the cost required for the connection.

Further, one end of each of the windings is provided on the side of the stator core, which side is opposite to the rotor. Thus, connection can be established with external circuits without permitting the windings to cross over the axial end of the coil (coil end).

In a second aspect of the inventive stator for rotary electric machine, each of the windings for the individual phases is formed of a conductor having substantially a rectangular cross section perpendicular to the longitudinal direction, and a resin film. Thus, the coil can be formed at low cost.

In a third aspect of the inventive stator for rotary electric machine, each of the turn portions has a cranked shape. Thus, when a different stator wire member is set at the adjacent slot, the radial positions of the associated turn portions are offset from each other to suppress the occurrence of interference therebetween. As a result, the size of the coil can be reduced.

In a fourth aspect of the inventive stator for rotary electric machine, each of the turn portions is formed into a staircase (or stepwise) pattern. Thus, when a different stator wire member is set at the adjacent slot, the axial positions of the associated turn portions are offset from each other to suppress the occurrence of interference therebetween. As a result, the size of the coil can be reduced.

In a fifth aspect of the inventive stator for rotary electric machine, one step of the staircase pattern of each turn portion is ensured to have a height corresponding to the thickness of each of the windings for the individual phases. Thus, when a different stator winding is set at the adjacent slot, the associated turn portions are axially laid one on the other, whereby the occurrence of interference between the turn portions can be suppressed. As a result, the size of the coil can be reduced.

In a sixth aspect of the inventive stator for rotary electric machine, the slot-accommodated portions of each of the windings for the individual phases are juxtaposed in each slot so as to be aligned depthwise (i.e., in the direction along the depth of each slot). Thus, the magnetic characteristics can be enhanced in each of the windings for the individual phases.

In a seventh aspect of the inventive stator for rotary electric machine, by permitting each return portion to be located on the innermost peripheral side, the end of the two wire members configuring the individual phases may no longer be positioned on the inner peripheral side of the coil, and thus may no longer cross over the axial coil end. As a result, the size of the coil can be reduced.

In an eight aspect of the inventive stator for rotary electric machine, neither end of each of the windings for the individual phases may cross over the axial coil end any longer. As a result, the size of the coil can be reduced.

A ninth aspect of inventive rotary electric machine uses the stator whose size has been reduced. Thus, the size of the rotary electric machine can also be reduced.

BRIEF DESCRIPTION OF THE DRAWINGS

In the accompanying drawings:

FIG. 10 is an illustration of a plastic body of stator windings forming the coil of the rotary electric machine according to the embodiment;

DETAILED DESCRIPTION OF THE PREFERRED EMBODIMENTS

With reference to the accompanying drawings, hereinafter will be described a stator for rotary electric machine and a rotary electric machine using the stator, according to an embodiment of the present invention.

Embodiment

Figure 1:
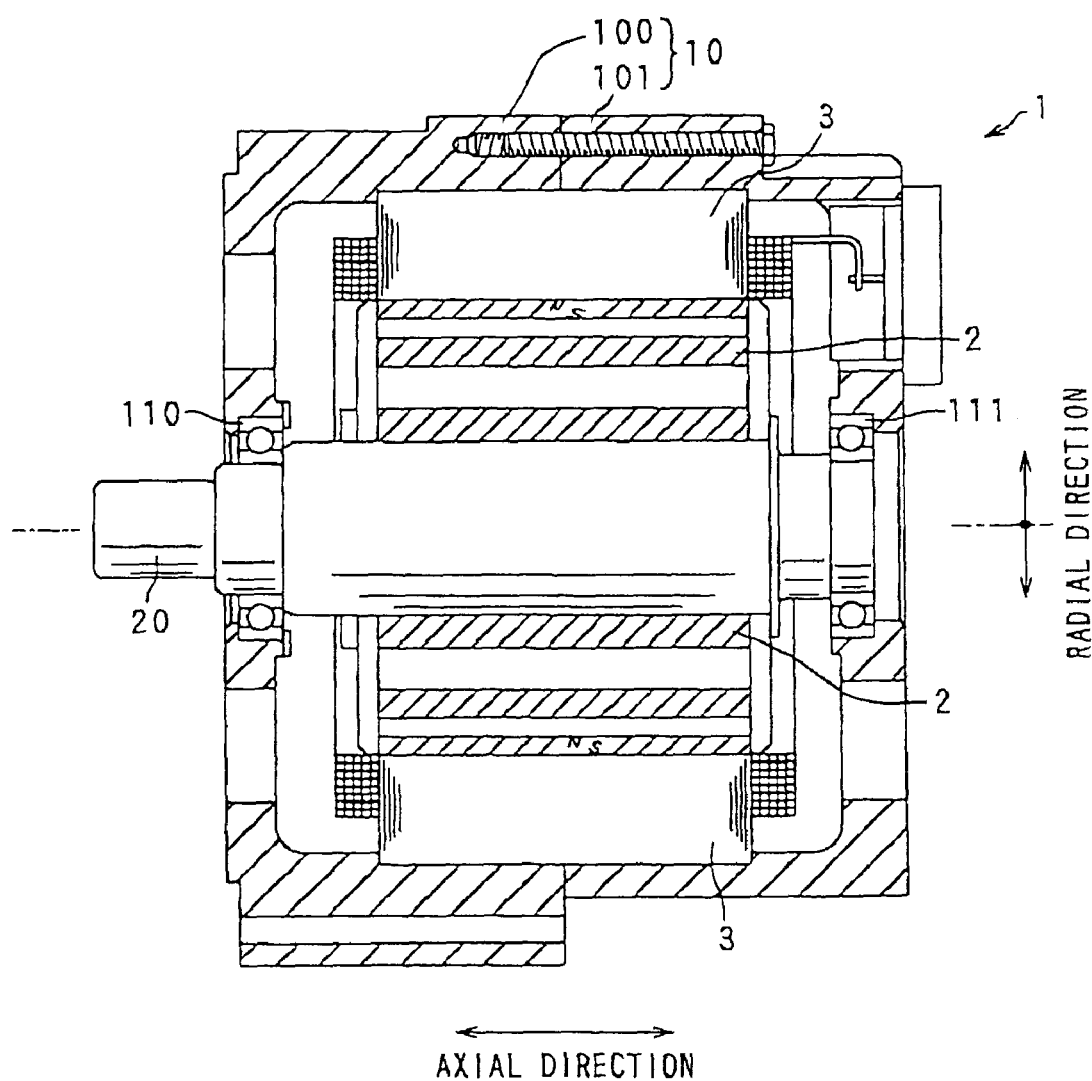
FIG. 1 is schematic diagram illustrating a rotary electric machine according to an embodiment of the present invention.

FIG. 1 is a schematic diagram illustrating a rotary electric machine according to the present embodiment. A rotary electric machine 1 according to the present embodiment includes: a housing 10 consisting of a pair of substantially cylindrical bottomed housing members 100 and 101 which are joined through openings thereof; a rotor 2 fixed to a rotary shaft 20 which is rotatably supported through bearings 110 and 111; and a stator 3 fixed to the housing 10 at a position in the housing 10, for enclosing the rotor 2.

The rotor 2 is produced as an inner rotor type in the present embodiment, but may be produced as an outer rotor type. The rotor 2 is provided with a plurality of alternately differentiated magnetic poles along the circumferential direction on the outer periphery thereof which faces the inner periphery of the stator 3. The number of magnetic poles of the rotor 2 is differentiated depending on the rotary electric machines, and thus the number is not intended to be limited. The rotor used in the present embodiment has eight poles (four N-poles and four S-poles).

Figure 2:
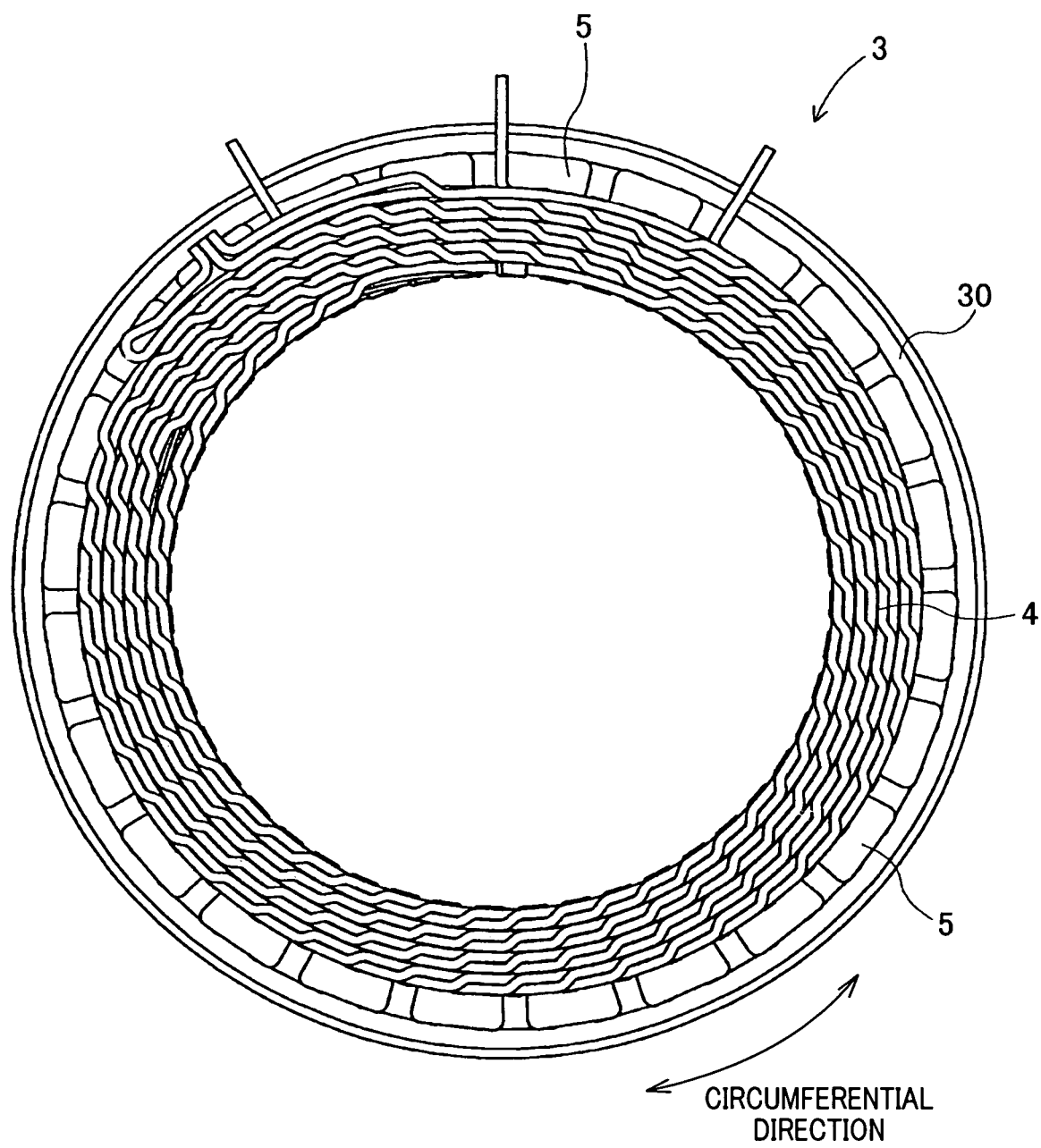
FIG. 2 is a perspective illustration of a stator in the rotary electric machine according to the embodiment.

As shown in FIG. 2, the stator 3 includes a stator core 30, a three-phase coil 4 formed of a plurality of phase windings, and insulating paper 5 arranged between the stator core 30 and the coil 4.

Figure 3:
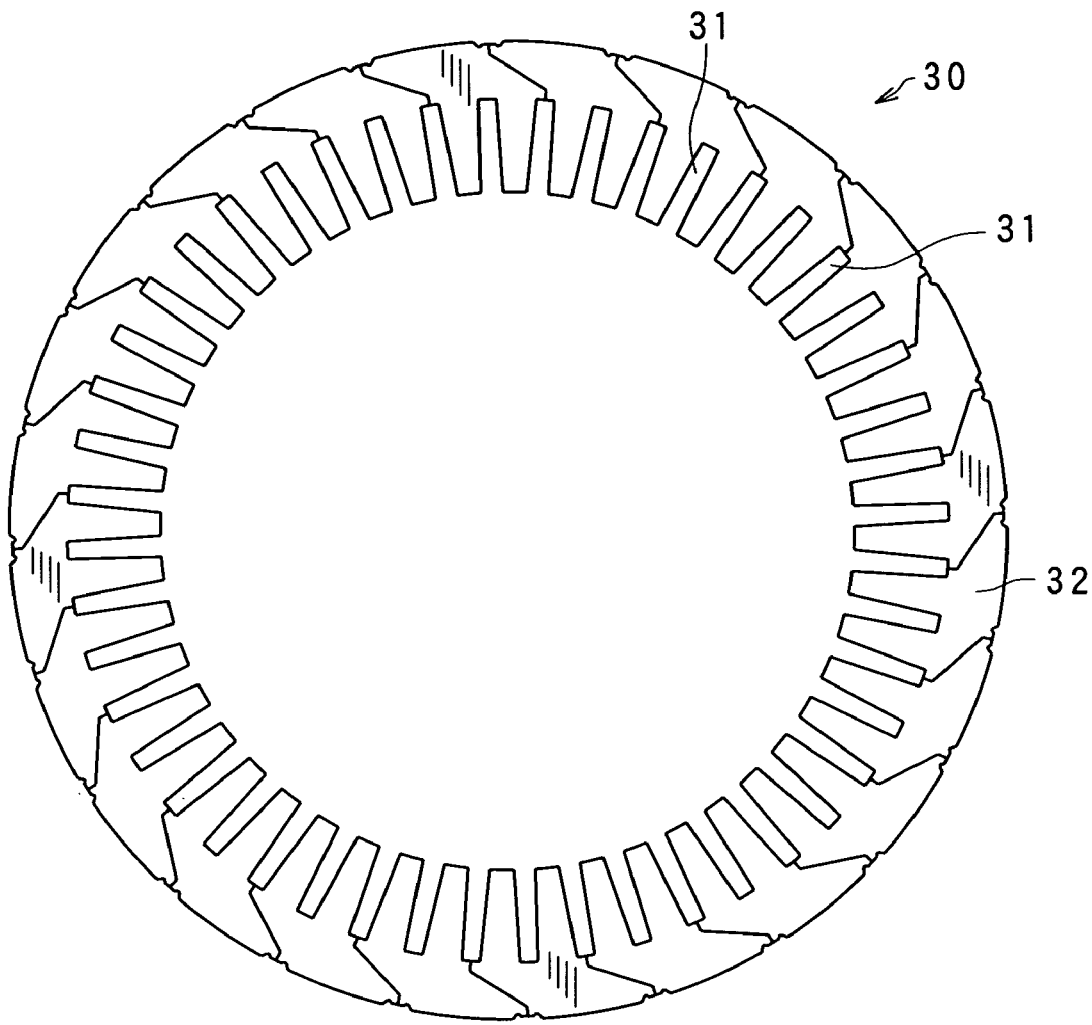
FIG. 3 is an illustration of a core of the stator in the rotary electric machine according to the embodiment.

As shown in FIG. 3, the stator core 30 has an annular shape, with a plurality of slots 31 being formed along its inner periphery. The plurality of slots 31 are formed in such a manner that the depthwise direction thereof coincides with the radial direction. The number of slots 31 formed in the stator core 30 is determined so that, for each of the magnetic poles of the rotor 2, two slots can be formed for each phase of the coil 4. That is, since the rotor 2 has eight magnetic poles in, and the coil 4 has three phases which are to be provided with two slots each, a total of 8×3×2=48 slots 31 are formed.

Figure 4:
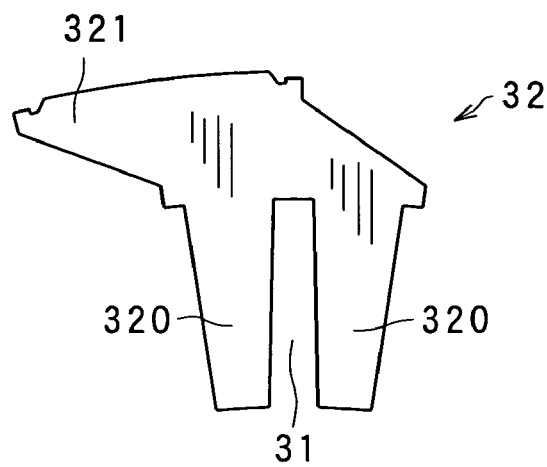
FIG. 4 illustrates one of the segments configuring the core of the stator in the rotary electric machine according to the embodiment.

In the stator core 30, twenty-four segment cores 32, one of which is shown in FIG. 4, are formed along its circumference. Each segment core 32 is formed into a shape which defines per se one slot 31 and also defines one slot together with another circumferentially adjacent segment core 32. In particular, the segment core 32 includes teeth portions 320 which extend in the inner radial direction and a back core portion 321 formed with the teeth portions 320.

The stator core 30, or each of the segment cores 32 configuring the stator core 30, is formed by laminating four hundred and ten electromagnetic steel plates each having a thickness of 0.3 mm with an insulating film being disposed therebetween. The stator core 30 may be formed of not only a laminated body of such electromagnetic plates, but also a laminated body of known metal plates and insulating films.

Figure 5A:
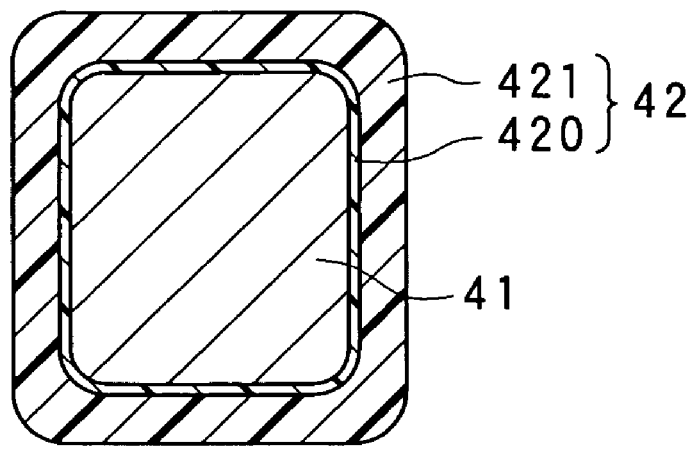
FIGS. 5A and 5B are cross sections each illustrating the configuration of a phase winding used for the coil of the rotary electric machine according to the embodiment.

The coil 4 is obtained by winding a plurality of winding wires 440 using a given winding method. As shown in FIG. 5A, each of the wire members 40 configuring the coil 4 is formed of a copper conductor 41 and an insulating film 42. The insulating film 42 consists of an inner layer 420 and an outer layer 421 for covering the outer periphery of the conductor 41 and for insulating the conductor 41. The total thickness of the inner and outer layers 420 and 421 of the insulating film 42 is set so as to fall within a range of 100 μm to 200 μm. Thus, the thickness of the insulating film 42 consisting of the inner and outer layers 420 and 421 is so large that there is no need of interposing insulating paper, for example, in between the wiring wires 440, for achieving insulation therebetween. Still, however, the insulating paper 5 may be arranged to ensure the insulation between the wires.

Figure 5B:
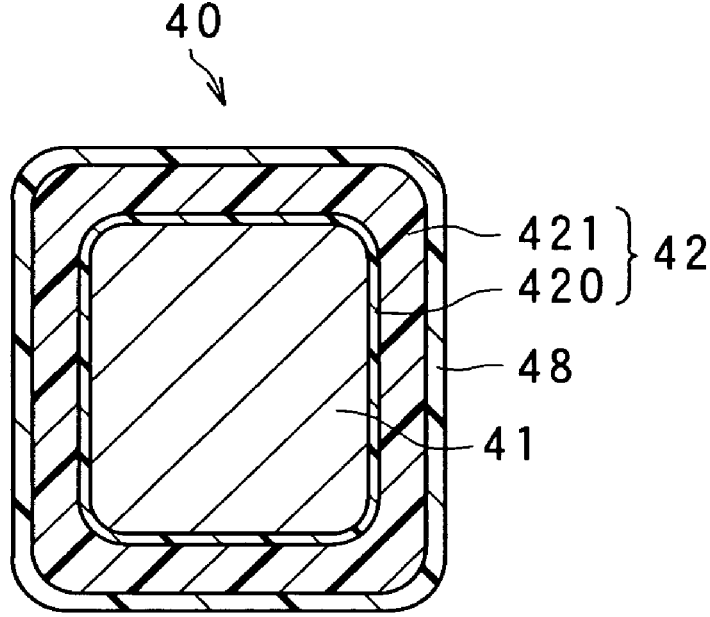

As shown in FIG. 5B, in each wire member 40 of the coil 4, the outer periphery of the insulating film 42 consisting of the inner and outer layers 420 and 421 may be covered with a fusing member 38 made of an epoxy resin, for example. The fusing member 48 covering the respective wires melts faster than the insulating film 42 with the heat generated in the rotary electric machine. Thus, thermal adhesion is caused between the plurality of wire members 40 disposed in a slot 31 by the fusing members 48. As a result, the plurality of wire member 40 disposed in the slot 31 are integrated and turn to a steel strip, whereby the mechanical strength of the wire members 40 in the slot 31 is enhanced.

Figure 6:
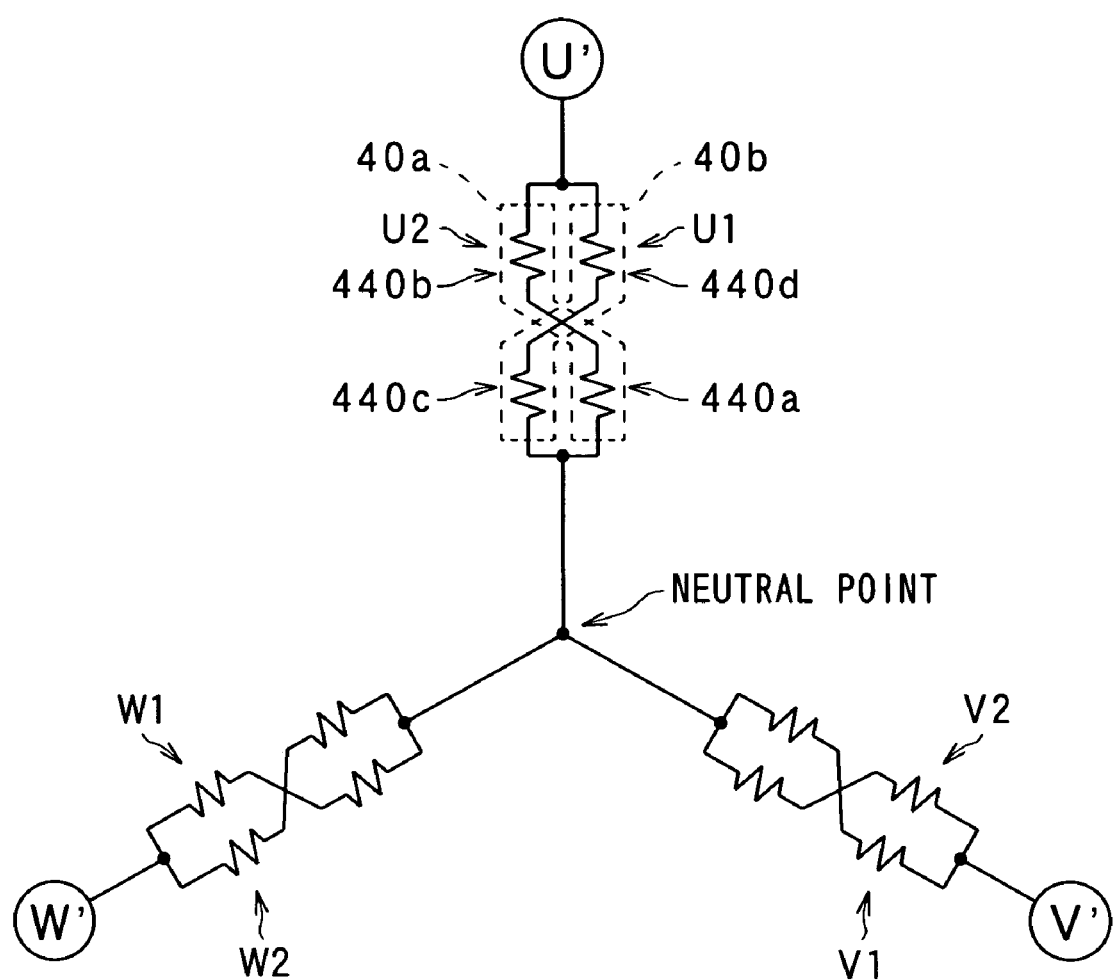
FIG. 6 is an illustration of wire connection in the coil of the rotary electric machine according to the present embodiment.

As shown in FIG. 6, the coil 4 is formed of three-phase windings (U1, U2, V1, V2, W1, W2). In particular, phase U is formed by serially connecting a winding wire 440a forming phase U1 to a winding wire 440*b* forming phase U2, by serially connecting a winding wire 440*c* forming phase U2 to a winding wire 440*d* forming phase U1, and by parallelly connecting the winding wires 440*a*, 440*b* to the winding wires 440*c*, 440*d*. Phases V and W are formed in the similar manner.

Figure 7:
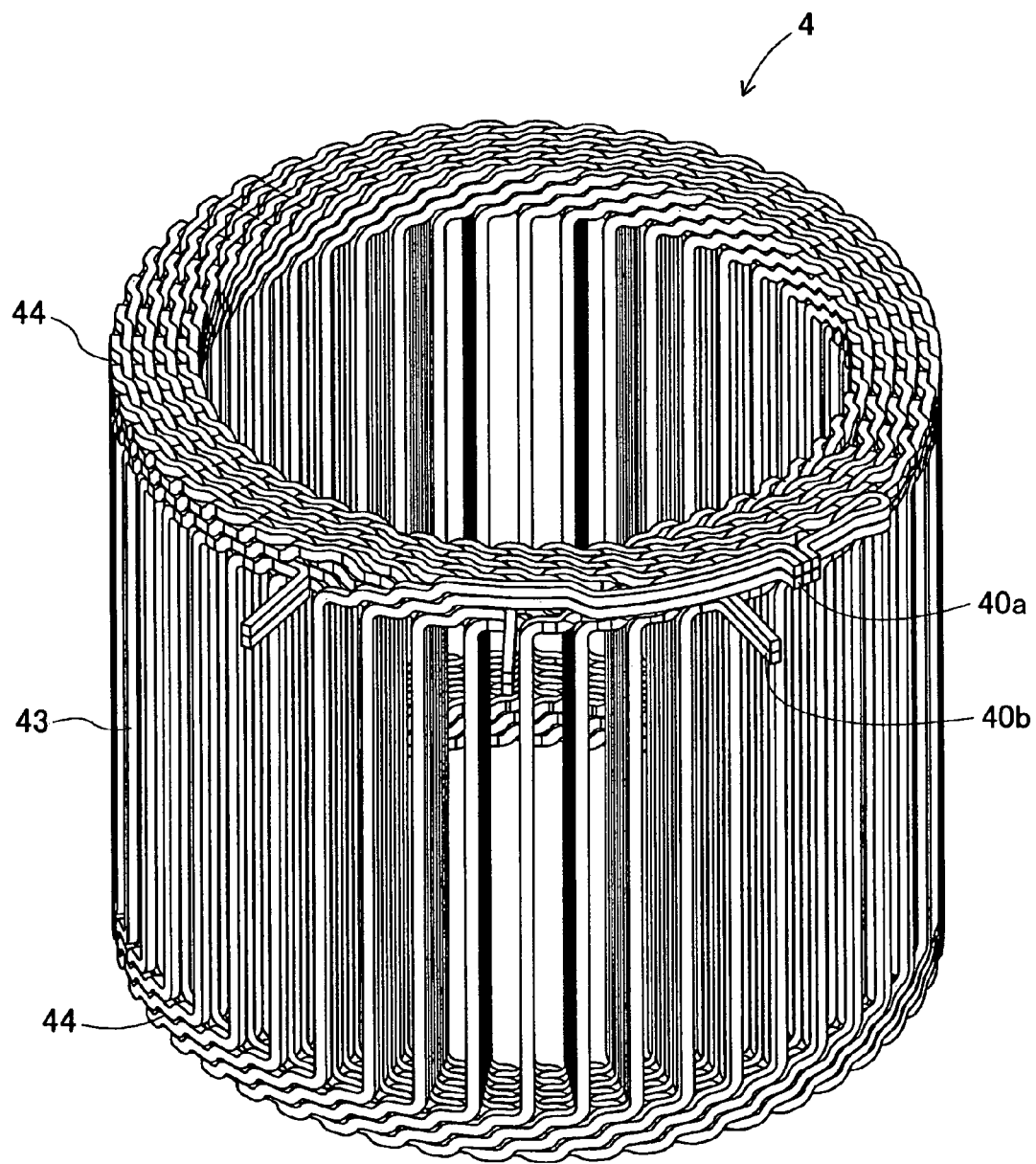
FIG. 7 is a perspective illustration of the coil of the rotary electric machine according to the embodiment.

As shown in FIG. 7, the coil 4 is formed by winding a plurality of the wire members 40 so as to have a given shape. Each of the wire members 40 configuring the coil 4 is provided in a manner of wave winding, along the circumferential direction on the inner peripheral side of the stator core 30. The coil 4 includes linear slot-accommodated portions 43 to be accommodated in the slots 31 formed in the stator core 30, and turn portions 44 for connecting adjacent slot-accommodated portions 43. In one phase, the slot-accommodated portions 43 are each accommodated in every predetermined ordinal slot 31 (every sixth (3-phase×2=6) slot 31 in the present embodiment). Each turn portion 44 is formed being projected from the axial end face of the stator core 30.

Specifically, the coil 4 is formed by winding a plurality of wire members 40 in a wavy shape along the circumferential direction, with one end of each of them being projected from the axial end face of the stator core 30.

More specifically, for example, phase U of the coil 4 consists of phases U1 and U2. Phase U1 is formed of the first and second windings 440*a* and 440*d*, while phase U2 is formed of the first and second windings 440*b* and 440*c*. The first winding 440*a* forming phase U1 and the second winding 440*b* forming phase U2 are connected to each other at one end thereof and circumferentially wound in a wavy form, with one of the other ends being projected from the axial end face of the stator core 30. Similarly, the first winding 440*c* forming phase U2 and the second winding 440*d* forming phase U1 are connected to each other at one end thereof and circumferentially wound in a wavy form, with one of the other ends being projected from the axial end face of the stator core 30.

The slot-accommodated portions 43 of the first and second windings 440*a* and 440*d* are accommodated in the same ordinal slots 31, while the slot-accommodated portions 43 of the first and second windings 440*b* and 440*c* are accommodated in the same ordinal slots 31 which are different from those for the slot-accommodated portions 43 of the first and second windings 440*a* and 440*d*. In this case, the slot-accommodated portions 43 of the first winding 440*a* and the slot-accommodated portions 43 of the second winding 440*d* are permitted to be alternately disposed depthwise in the slots 31. Similarly, the slot-accommodated portions 43 of the first winding 440*b* and the slot-accommodated portions 43 of the second winding 440*c* are permitted to be alternately disposed depthwise in the slots 31. Each of connected portions 45 between the first and second windings 440*a* and 440*b* and between the first and second windings 440*c* and 440*d* is formed in a return portion 46 made up of the slot-accommodated portion 43.

In the coil 4, one phase is formed of two connected wire bodies connected in parallel, that is, a connected winding member consisting of the first and second windings 440*a* and 440*b*, and a connected winding member consisting of the first and second windings 440*c* and 440*d*. Accordingly, three phases (U, V, W) in the coil 4 are formed by using six connected wire bodies each formed of two wire members 40 connected to each other. Thus, the coil 4 is formed by using twelve (2 wire members 40*a* and 40*b*×3 phases (U, V, W)×2 slots=12) wire members 40.

In the present embodiment, the each connected winding member formed by connecting two wire members 40 is circumferentially wound four times to form the coil 4. Specifically, the coil 4 has a configuration in which each connected winding member formed by connecting two wire members 40 provides four layers in the radial direction, one layer being laid on the other. More specifically, one slot 31 accommodates four eight (4 layers×2 wire members=8) slot-accommodated portions 43. In forming the coil 4, the connected wire bodies each formed by connecting two wire members 40 are wound so that one end of each of them is positioned on the side of the outermost circumferential layer and the connected portion 45 of each of them is positioned on the side of the innermost circumferential layer.

In the coil 4, the turn portions 44 are formed on both axial ends of the stator core 30. Each turn portion 44 has a portion approximately at the center thereof, which is formed into a cranked shape without a twist. The cranked shape of the turn portion 44 is ensured to be provided in the circumferential direction. The amount of an offset caused by the cranked shape of the turn portion 44 is ensured to substantially correspond to the width of the wire members 40. Owing to this, no interference is caused between the turn portions 44 of each wire member 40, which are adjacently located in the radial direction, thereby enabling tight winding with the turn portions 44. As a result, the radial length of the coil end projected from the end face of the stator core 30 of the coil 4 can be reduced. Thus, the wire members 440 forming the coil 4 can be prevented from jutting outward in the radial direction.

Each turn portion 44 projected out of the stator core 30 from the slot 31 is formed into a staircase pattern starting from the axial end face of the stator core 30. The formation of the turn portion 44 into a staircase pattern can contribute to preventing possible interference between the staircase-pattern turn portions 44 of each wire member 40 and the wire members 40 projected from the circumferentially adjacent slots. Thus, it is no longer necessary to increase the height of the coil end projected from the end face of the stator core 30 of the coil 4, or to increase the radial length of the coil end, in order to avoid possible interference between the wire members 40 projected from the circumferentially adjacent slots. As a result, the height of the coil end can be reduced. Further, since the radial length of the coil end is reduced, the coil 4 can be prevented from jutting outward in the radial direction.

Each staircase-pattern turn portion 44 is formed so as to have four steps. The height of one step of the four-step staircase-pattern turn portion 44 substantially corresponds to the width (or height) of each wire member 40. Thus, when the turn portions 44 are axially laid one on the other, no gap is formed between the turn portions 44 to thereby enable tight winding with the turn portions 44.

As will be understood from the description provided above, the staircase-pattern turn portion 44 has a shape which is a combination of cranked shapes.

In the coil 4, one end of each of the connected wire bodies of the wire members 40 configuring the coil 4 is permitted to radially project outward within the range of the height of the coil end projecting from the stator core 30, i.e. within the range of the projection (or protrusion) of the turn portions 44. Also, the other end of each of the connected wire bodies, or the end on the side of a neutral point, is permitted to radially project outward at a higher level than the one end.

Referring now to FIGS. 8 to 13, hereinafter will be provided a more detailed description on the winding conditions of the wire members 40 configuring the coil 4 of the present embodiment.

Figure 8:
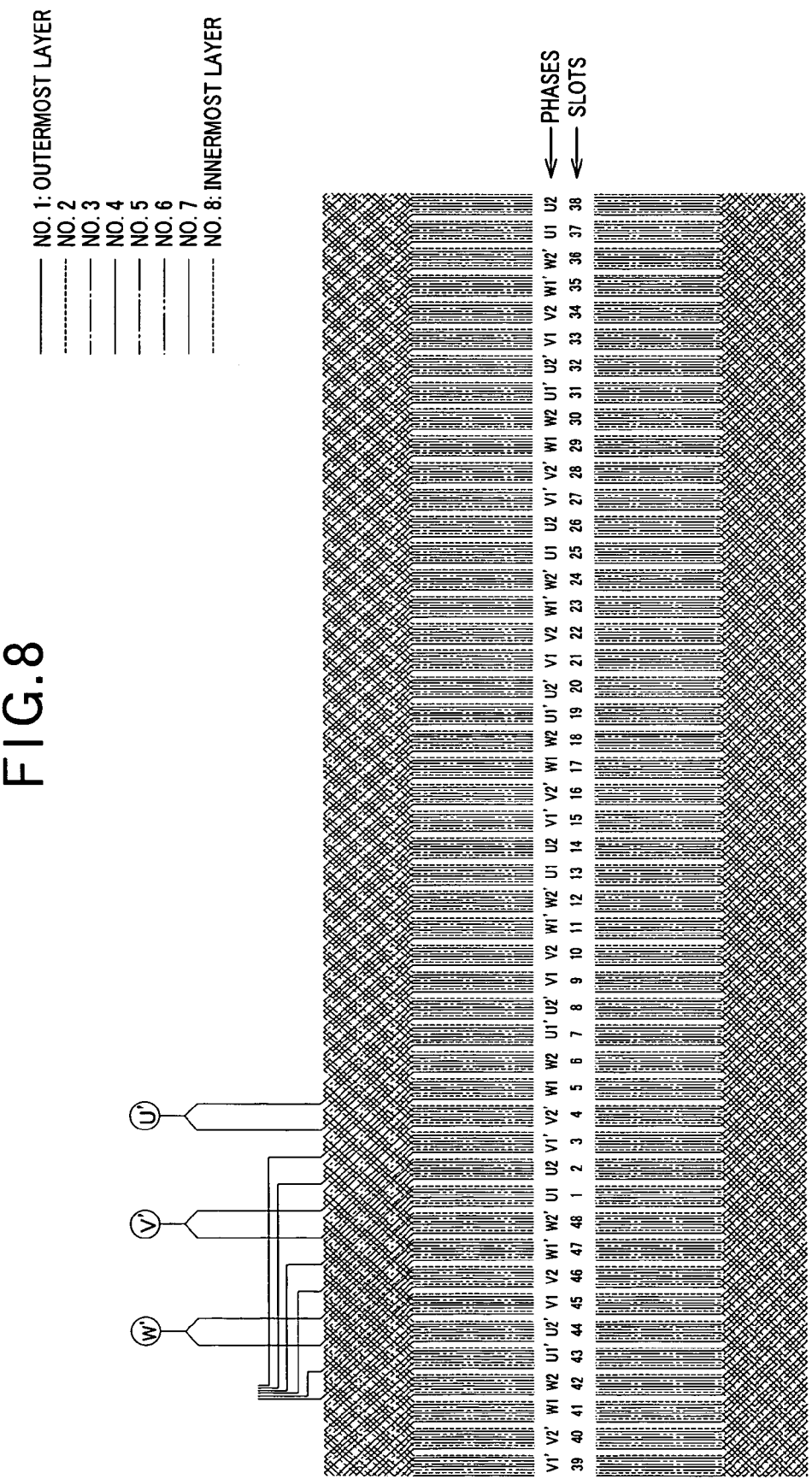
FIG. 8 is an illustration of wire connection in the coil of the rotary electric machine according to the embodiment.
Figure 9:
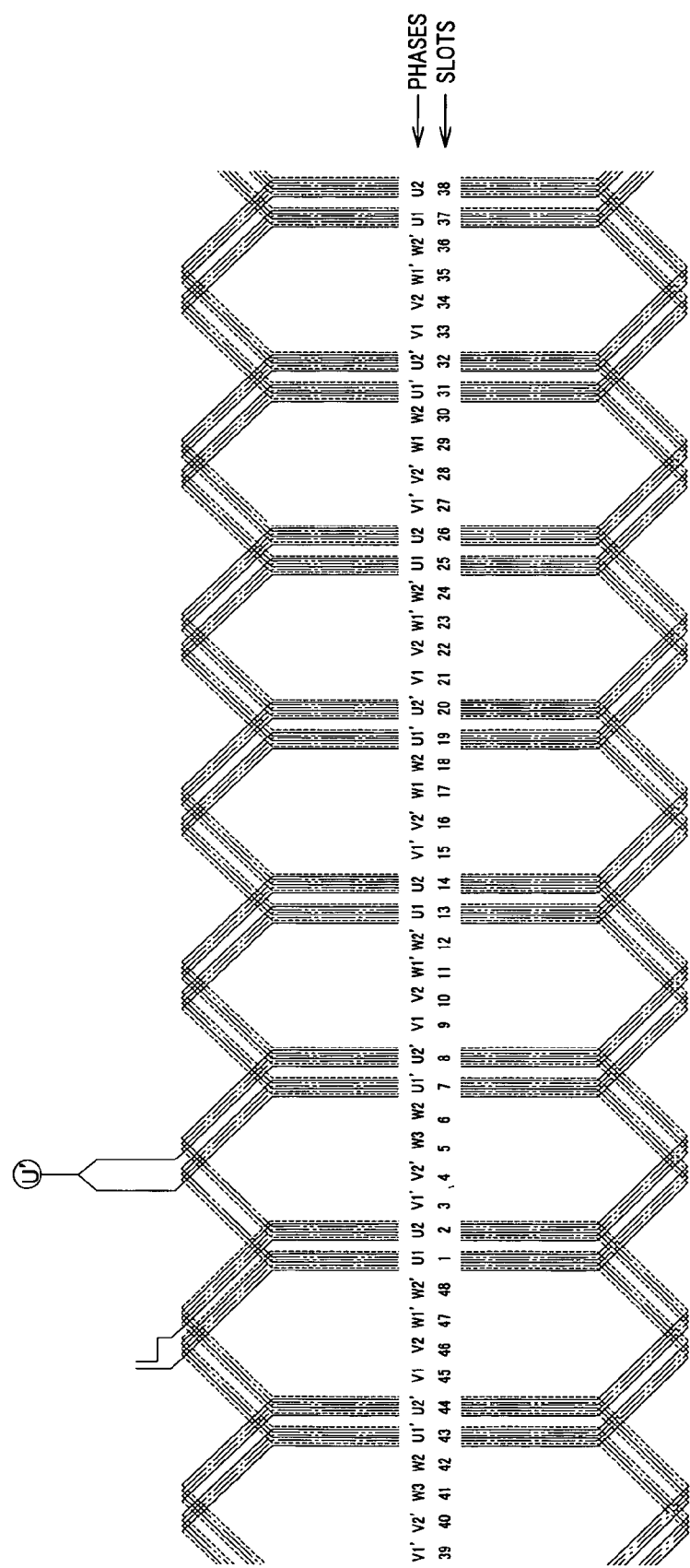
FIG. 9 is an illustration of U-phase wire connection in the coil of the rotary electric machine according to the embodiment.

The coil 4 of the present embodiment is formed of two thee-phase windings (U1, U2, V1, V2, W1, W2). FIG. 8 shows connecting conditions of the three-phase windings. The slot numbers in FIG. 8 have been designated by designating "#1" to the slot 31 accommodating the slot-accommodated portion 43 located closest to the end on the side of the neutral point of the wire members 40 forming phase U1. The subsequent slots 31 have been sequentially designated with "#2", "#3", . . . along the circumferential direction in which the wire members 40 are wound, for the sake of convenience. FIG. 9 shows the connecting conditions of only the wire members 40 forming phase U (U1, U2) shown in FIG. 8. In FIGS. 8 and 9, those portions which are linearly and vertically illustrated correspond to the slot-accommodated portions 43, and those portions which are obliquely illustrated on the upper and lower sides correspond to the turn portions 44.

FIG. 10 is a development of the coil 4 according to the present embodiment. As shown in FIG. 10, in the coil 4, the ends of the first and second windings 440a and 440c are connected on the side of the neutral point, and the ends of the first and second windings 440b and 440d are connected on the side of the phase terminal. The coil 4 is formed using six connected wire bodies in each of which two wire members 40 are connected at one ends thereof, for respective phases (U1, U2, V1, V2, W1, W2). The two wire members 40 form a single copper wire in which the end of one wire member on the side of the neutral point is connected to the end of the other wire member, which end is opposite to the end on the side of the phase terminal. Welding may be used for establishing this connection.

Figure 11A:
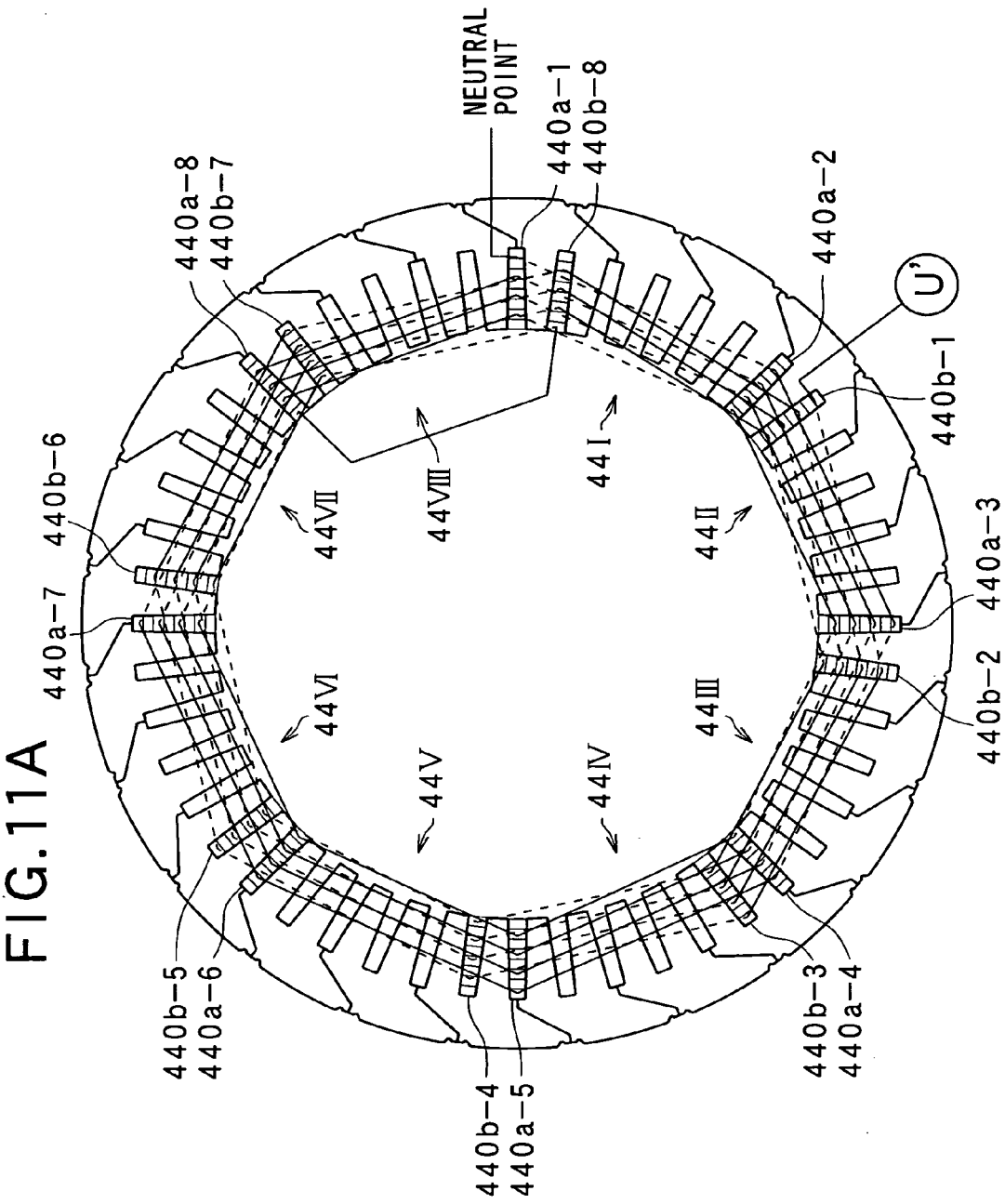
FIG. 11A is an illustration of connecting conditions of phase U1 in the coil of the rotary electric machine according to the embodiment.
Figure 12A:
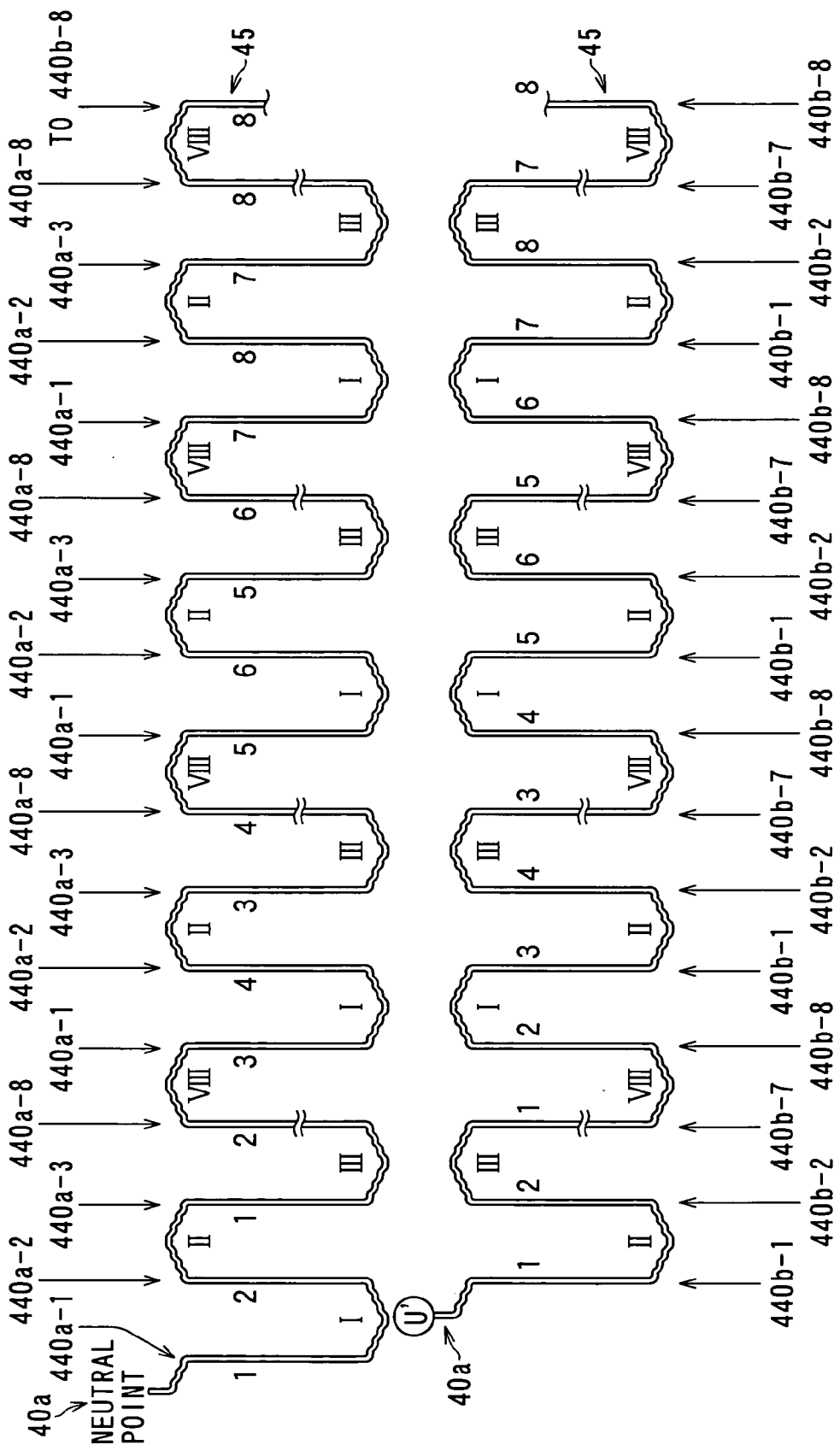
FIG. 12A is an illustration of U1-phase windings in position in the slots in the rotary electric machine according to the embodiment.
Figure 12B:
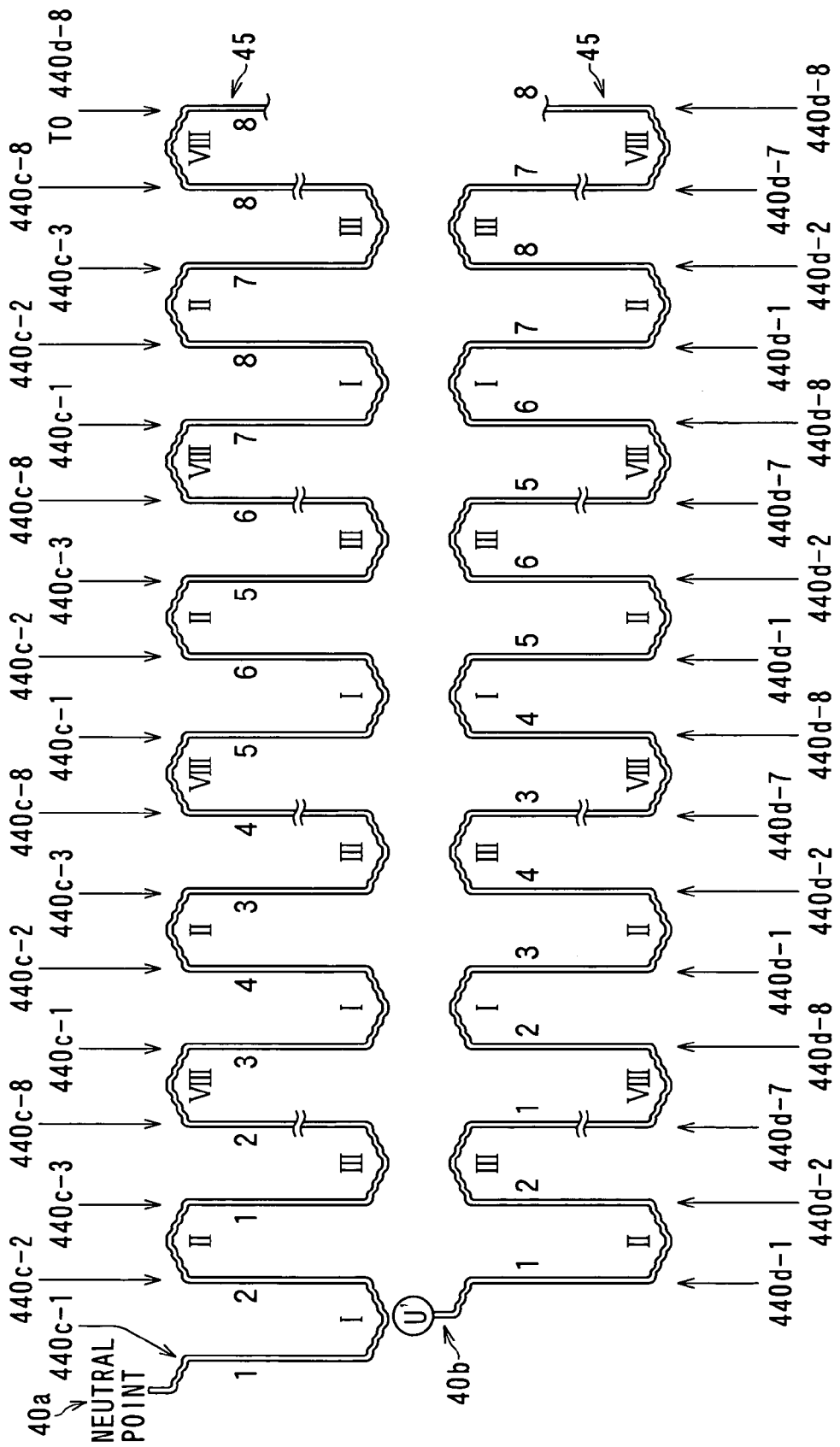
FIG. 12B is an illustration of U1-phase windings in position in the slots in the rotary electric machine according to the embodiment.

Each of the phases is formed using a similar connecting method. The connecting method, or the manner of winding the wire members 40 of the coil 4, is explained taking phase U as an example. FIG. 11A shows connecting conditions of the first and second windings 440a, 440b, and FIG. 11A shows connecting conditions of the first and second windings 440c, 440d. FIG. 12A shows a relationship of the depthwise positions of the first and second windings 440a, 440b in the individual slots, to the turn portions. FIG. 12B shows a relationship of the depthwise positions of the first and second windings 440c, 440d in the individual slots, to the turn portions.

Referring now to FIGS. 11A and 12A, hereinafter are explained the connecting conditions of the first and second windings 440a, 440b. The stator core 30 is formed with sixteen slots 440a-1, 440a-2, . . . 440a-8, 440b-1, 440b-2, . . . and 440b-8 for accommodating the wire members 40 forming phase U in conformity with the eight magnetic poles of the rotor 2. Each of the slots accommodates eight slot-accommodated portions 43, which are aligned depthwise, one being laid on the other. The positions where the respective slot-accommodated portions 43 are located depthwise for accommodation in each slot are designated with "No. 8", "No. 7", "No. 6" . . . , "No. 1" as the depth increases from the opening portion.

The winding wires 440a, 440b are serially connected. An end of the winding wire 440a in the slot 440a-1 is connected to the neutral point, while an end of the winding wire 440b in the slot 440b-1 is connected to the winding wire 440d, for connection to a U-phase terminal.

The slot-accommodated portion 43 of the first winding 440a, which is nearest to the neutral point, is accommodated at position "No. 1" of the slot 440a-1. The slot-accommodated portion 43 of the second winding 440b, which is nearest to the end portion of the second winding 440b, is accommodated at position "No. 1" of the slot 440b-1.

The subsequent slot-accommodated portion 43 of the first winding 440a is connected to the slot-accommodated portion 43 accommodated in the slot 440a-1 through a turn portion 44I (bottom) on one end side (hereinafter referred to as "lower side"), and accommodated at position "No. 2" of the slot 440a-2. This lower side trails from the other end side (hereinafter referred to as "upper side") from which the end of the first winding 440a to be connected to the neutral point is projected in the axial direction of the stator core 30. Thus, the turn portion 44I (bottom) connects position "No. 1" of the slot 440a-1 to position "No. 2" of the slot 440a-2, on the lower side of the stator core 30.

The slot-accommodated portion 43 of the first winding 440a subsequent to the one accommodated in the slot 440a-2 is accommodated at position "No. 1" of the slot 440a-3, being connected through the turn portion 44II (top). Thus, the turn portion 44II (top) connects position "No. 2" of the slot 440a-2 to position "No. 1" of the slot 440a-3, on the upper side of the stator core 30.

The slot-accommodated portion 43 of the first winding 440a subsequent to the one accommodated in the slot 440a-3 is accommodated at position "No. 2" of the slot 440a-4, being connected through the turn portion 44III (bottom).

Thus, the turn portion 44III (bottom) connects position "No. 1" of the slot 440a-3 to position "No. 2" of the slot 440a-4, on the lower side of the stator core 30.

The subsequent slot-accommodated portion 43 of the second winding 440b is connected to the slot-accommodated portion 43 accommodated in the slot 440b-1 through a turn portion 44II (bottom) on one end side (hereinafter referred to as "lower side") and accommodated at position "No. 2" of the slot 440b-2. This lower side trails from the other end side (hereinafter referred to as "upper side") from which the end of the second winding 440b to be connected to phase U is projected in the axial direction of the stator core 30. Thus, the turn portion 44II (bottom) connects position "No. 1" of the slot 440b-1 to position "No. 2" of the slot 440b-2, on the lower side of the stator core 30.

The slot-accommodated portion 43 of the winding wire 440b subsequent to the one accommodated in the slot 440b-2 is accommodated at position "No. 1" of the slot 440b-3, being connected through the turn portion 44III (top). Thus, the turn portion 44III (top) connects position "No. 2" of the slot 440b-2 to position "No. 1" of the slot 440b-3, on the upper side of the stator core 30.

The slot-accommodated portion 43 of the second winding 440b subsequent to the one accommodated in the slot 440b-3 is accommodated at position "No. 2" of the slot 440b-4, being connected through the turn portion 44IV (bottom). Thus, the turn portion 44IV (bottom) connects position "No. 1" of the slot 440b-3 to position "No. 2" of the slot 440b-4, on the lower side of the stator core 30.

In this way, in the two windings 440a, 440b, the turn portions 44II (top) to 44VII (top) positioned on the upper side of the stator core 30 connect position "No. 2" to position "No. 1" between the adjacent slot-accommodated portions 43, and the turn portions 44I (bottom) to 44VIII (bottom) positioned on the lower side connect position "No. 1" to position "No. 2" between the adjacent slot-accommodated portions 43. Using this connecting method, the slot-accommodated portions 43 of the two windings 440a, 440b are disposed in the slots 440a-1 to 440a-8 and slots 440b-1 to 440b-8, respectively, with one circumferential winding. In the slots 440a-8, 440b-8, the slot-accommodated portions 43 of the first and second windings 440a, 440b, respectively, are accommodated at positions "No. 2".

The slot-accommodated portions 43 of the first and second windings 440a, 440b subsequent to the ones accommodated at positions "No. 2" of the slots 440a-8, 440b-8, respectively, are accommodated at positions "No. 3" of the slots 440a-1, 440b-1. Thus, the turn portions 44VIII (top) and 44I (top) establish connection from positions "No. 2" of the slots 440a-

8, 440*b*-8 to positions "No. 3" of the slots 440*a*-1, 440*b*-1, respectively, on the upper side of the stator core 30. In other words, with one circumferential winding, each connected winding member is radially inwardly offset by the width of the wire member.

The slot-accommodated portion 43 of the first winding 440*a* subsequent to the one accommodated at position "No. 3" of the slot 440*a*-1 is accommodated at position "No. 4" of the slot 440*a*-2, being connected through the turn portion 44I (bottom). Thus, the turn portion 44I (bottom) connects position "No. 3" of the slot 440*a*-1 to position "No. 4" of the slot 440*a*-2, on the lower side of the stator core 30.

The slot-accommodated portion 43 of the first winding 440*a* subsequent to the one accommodated in the slot 440*a*-2 is accommodated at position "No. 3" of the slot 440*a*-3, being connected through the turn portion 44II (top). Thus, the turn portion 44II (top) connects position "No. 4" of the slot 440*a*-2 to position "No. 3" of the slot 440*a*-3, on the upper side of the stator core 30.

The slot-accommodated portion 43 of the first winding 440*a* subsequent to the one accommodated in the slot 440*a*-3 is accommodated at position "No. 4" of the slot 440*a*-4, being connected through the turn portion 44III (bottom). Thus, the turn portion 44III (bottom) connects position "No. 3" of the slot 440*a*-3 to position "No. 4" of the slot 440*a*-4, on the lower side of the stator core 30.

The slot-accommodated portion 43 of the second winding 440*b* subsequent to the one accommodated at position "No. 3" of the slot 440*b*-1 is accommodated at position "No. 4" of the slot 440*b*-2, being connected through the turn portion 44II (bottom). Thus, the turn portion 44II (bottom) connects position "No. 3" of the slot 440*b*-1 to position "No. 4" of the slot 440*b*-2, on the lower side of the stator core 30.

The slot-accommodated portion 43 of the second winding 440*b* subsequent to the one accommodated in the slot 440*b*-2 is accommodated at position "No. 3" of the slot 440*b*-3, being connected through the turn portion 44III (top). Thus, the turn portion 44III (top) connects position "No. 4" of the slot 440*b*-2 to position "No. 3" of the slot 440*b*-3, on the upper side of the stator core 30.

The slot-accommodated portion 43 of the second winding 440*b* subsequent to the one accommodated in the slot 440*b*-3 is accommodated at position "No. 4" of the slot 440*b*-4, being connected through the turn portion 44IV (bottom). Thus, the turn portion 44IV (bottom) connects position "No. 3" of the slot 440*b*-3 to position "No. 4" of the slot 440*b*-4, on the lower side of the stator core 30.

In this way, in the two windings 440*a*, 440*b*, the turn portions 44II (top) to 44VII (top) positioned on the upper side of the stator core 30 connect position "No. 3" to position "No. 4" between the adjacent slot-accommodated portions 43, and the turn portions 44I (bottom) to 44VIII (bottom) positioned on the lower side connect position "No. 3" to position "No. 4" between the adjacent slot-accommodated portions 43. Using this connecting method, the slot-accommodated portions 43 of the two windings 440*a*, 440*b* are disposed in the slots 440*a*-1 to 440*a*-8 and slots 440*b*-1 to 440*b*-8, respectively, with one circumferential winding. In the slots 440*a*-8, 440*b*-8, the slot-accommodated portions 43 of the first and second windings 440*a*, 440*b*, respectively, are accommodated at positions "No. 4".

The slot-accommodated portions 43 of the first and second windings 440*a*, 440*b* subsequent to the ones accommodated at positions "No. 4" of the slots 440*a*-8, 440*b*-8, respectively, are accommodated at positions "No. 5" of the slots 440*a*-1, 440*b*-1. Thus, the turn portions 44VIII (top) and 44I (top) establish connection from positions "No. 4" of the slots 440*a*-

8, 440*b*-8 to positions "No. 5" of the slots 440*a*-1, 440*b*-1, respectively, on the upper side of the stator core 30. In other words, with one circumferential winding, each connected winding member is radially inwardly offset by the width of the wire member.

The slot-accommodated portion 43 of the first winding 440*a* subsequent to the one accommodated at position "No. 5" of the slot 440*a*-1 is accommodated at position "No. 6" of the slot 440*a*-2, being connected through the turn portion 44I (bottom). Thus, the turn portion 44I (bottom) connects position "No. 5" of the slot 440*a*-1 to position "No. 6" of the slot 440*a*-2, on the lower side of the stator core 30.

The slot-accommodated portion 43 of the first winding 440*a* subsequent to the one accommodated in the slot 440*a*-2 is accommodated at position "No. 5" of the slot 440*a*-3, being connected through the turn portion 44II (top). Thus, the turn portion 44II (top) connects position "No. 6" of the slot 440*a*-2 to position "No. 5" of the slot 440*a*-3, on the upper side of the stator core 30.

The slot-accommodated portion 43 of the first winding 440*a* subsequent to the one accommodated in the slot 440*a*-3 is accommodated at position "No. 6" of the slot 440*a*-4, being connected through the turn portion 44III (bottom). Thus, the turn portion 44III (bottom) connects position "No. 5" of the slot 440*a*-3 to position "No. 6" of the slot 440*a*-4, on the lower side of the stator core 30.

The slot-accommodated portion 43 of the second winding 440*b* subsequent to the one accommodated at position "No. 5" of the slot 440*b*-1 is accommodated at position "No. 6" of the slot 440*b*-2, being connected through the turn portion 44II (bottom). Thus, the turn portion 44II (bottom) connects position "No. 5" of the slot 440*b*-1 to position "No. 6" of the slot 440*b*-2, on the lower side of the stator core 30.

The slot-accommodated portion 43 of the second winding 440*b* subsequent to the one accommodated in the slot 440*b*-2 is accommodated at position "No. 5" of the slot 440*b*-3, being connected through the turn portion 44III (top). Thus, the turn portion 44III (top) connects position "No. 6" of the slot 440*b*-2 to position "No. 5" of the slot 440*b*-3, on the upper side of the stator core 30.

The slot-accommodated portion 43 of the second winding 440*b* subsequent to the one accommodated in the slot 440*b*-3 is accommodated at position "No. 6" of the slot 440*b*-4, being connected through the turn portion 44IV (bottom) and. Thus, the turn portion 44IV (bottom) connects position "No. 5" of the slot 440*b*-3 to position "No. 6" of the slot 440*b*-4, on the lower side of the stator core 30.

In this way, in the two windings 440*a*, 440*b*, the turn portions 44II (top) to 44VII (top) positioned on the upper side of the stator core 30 connect position "No. 5" to position "No. 6" between the adjacent slot-accommodated portions 43, and the turn portions 44I (bottom) to 44VIII (bottom) positioned on the lower side connect position "No. 5" to position "No. 6" between the adjacent slot-accommodated portions 43. Using this connecting method, the slot-accommodated portions 43 of the two windings 440*a*, 440*b* are disposed in the slots 440*a*-1 to 440*a*-8 and slots 440*b*-1 to 440*b*-8, respectively, with one circumferential winding. In the slots 440*a*-8, 440*b*-8, the slot-accommodated portions 43 of the first and second windings 440*a*, 440*b*, respectively, are accommodated at positions "No. 6".

The slot-accommodated portions 43 of the first and second windings 440*a*, 440*b* subsequent to the ones accommodated at positions "No. 6" of the slots 440*a*-8, 440*b*-8, respectively, are accommodated at positions "No. 7" of the slots 440*a*-1, 440*b*-1. Thus, the turn portions 44VIII (top) and 44I (top) establish connection from positions "No. 6" of the slots 440*a*-

8, 440*b*-8 to positions "No. 7" of the slots 440*a*-1, 440*b*-1, respectively, on the upper side of the stator core 30. In other words, with one circumferential winding, the connected winding member is radially inwardly offset by the width of the wire member.

The slot-accommodated portion 43 of the first winding 440*a* subsequent to the one accommodated at position "No. 7" of the slot 440*a*-1 is accommodated at position "No. 8" of the slot 440*a*-2, being connected through the turn portion 44I (bottom). Thus, the turn portion 44I (bottom) connects position "No. 7" of the slot 440*a*-1 to position "No. 8" of the slot 440*a*-2, on the lower side of the stator core 30.

The slot-accommodated portion 43 of the first winding 440*a* subsequent to the one accommodated in the slot 440*a*-2 is accommodated at position "No. 7" of the slot 440*a*-3, being connected through the turn portion 44II (top). Thus, the turn portion 44II (top) connects position "No. 8" of the slot 440*a*-2 to position "No. 7" of the slot 440*a*-3, on the upper side of the stator core 30.

The slot-accommodated portion 43 of the first winding 440*a* subsequent to the one accommodated in the slot 440*a*-3 is accommodated at position "No. 8" of the slot 440*a*-4, being connected through the turn portion 44III (bottom). Thus, the turn portion 44III (bottom) connects position "No. 7" of the slot 440*a*-3 to position "No. 8" of the slot 440*a*-4, on the lower side of the stator core 30.

The slot-accommodated portion 43 of the second winding 440*b* subsequent to the one accommodated at position "No. 7" of the slot 440*b*-1 is accommodated at position "No. 8" of the slot 440*b*-2, being connected through the turn portion 44II (bottom). Thus, the turn portion 44II (bottom) connects position "No. 7" of the slot 440*b*-1 to position "No. 8" of the slot 440*b*-2, on the lower side of the stator core 30.

The slot-accommodated portion 43 of the second winding 440*b* subsequent to the one accommodated in the slot 440*b*-2 is accommodated at position "No. 7" of the slot 440*b*-3, being connected through the turn portion 44III (top). Thus, the turn portion 44III (top) connects position "No. 8" of the slot 440*b*-2 to position "No. 7" of the slot 440*b*-3, on the upper side of the stator core 30.

The slot-accommodated portion 43 of the second winding 440*b* subsequent to the one accommodated in the slot 440*b*-3 is accommodated at position "No. 8" of the slot 440*b*-4, being connected through the turn portion 44IV (bottom). Thus, the turn portion 44IV (bottom) connects position "No. 7" of the slot 440*b*-3 to position "No. 8" of the slot 440*b*-4, on the lower side of the stator core 30.

In this way, in the two windings 440*a*, 440*b*, the turn portions 44II (top) to 44VII (top) positioned on the upper side of the stator core 30 connect position "No. 7" to position "No. 8" between the adjacent slot-accommodated portions 43, and the turn portions 44I (bottom) to 44VIII (bottom) positioned on the lower side connect position "No. 7" to position "No. 8" between the adjacent slot-accommodated portions 43. Using this connecting method, the slot-accommodated portions 43 of the two windings 440*a*, 440*b* are disposed in the slots 440*a*-1 to 440*a*-8 and slots 440*b*-1 to 440*b*-8, respectively, with one circumferential winding. In the slots 440*a*-8, 440*b*-8, the slot-accommodated portions 43 of the first and second windings 440*a*, 440*b*, respectively, are accommodated at positions "No. 8".

Then, the slot-accommodated portions 43 accommodated at positions "No. 8" of the slots 440*a*-8, 440*b*-8 are connected to each other.

The slot-accommodated portions 43 accommodated at positions "No. 8" of the slots 440*a*-8, 440*b*-8 form the return portion 46. In this way, the connected winding member consisting of the two members 40*a*, 40*b* is wound about the stator core 30.

Figure 11B:
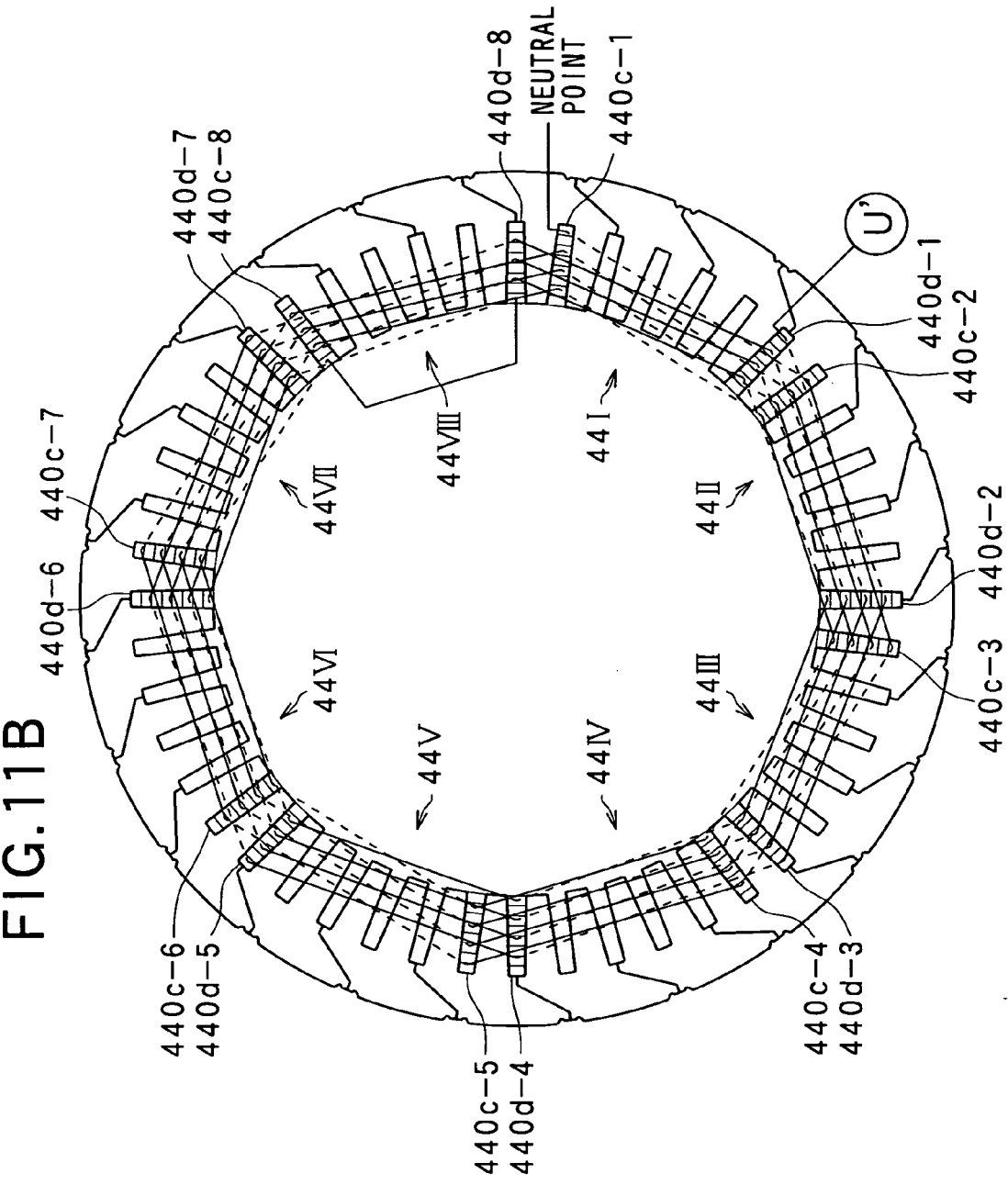
FIG. 11B is an illustration of connecting conditions of phase U1 in the coil of the rotary electric machine according to the embodiment.

The connecting conditions of the first and second windings 440*c*, 440*d* are as shown in FIGS. 11B and 12B. Since the manner of establishing connection (the manner of winding) is the same as that of the first and second windings 440*a*, 440*b*, detailed description is omitted.

In this way, the six connected wire bodies are wound to form phases U1, U2, V1, V2, W1, W2.

Figure 13:
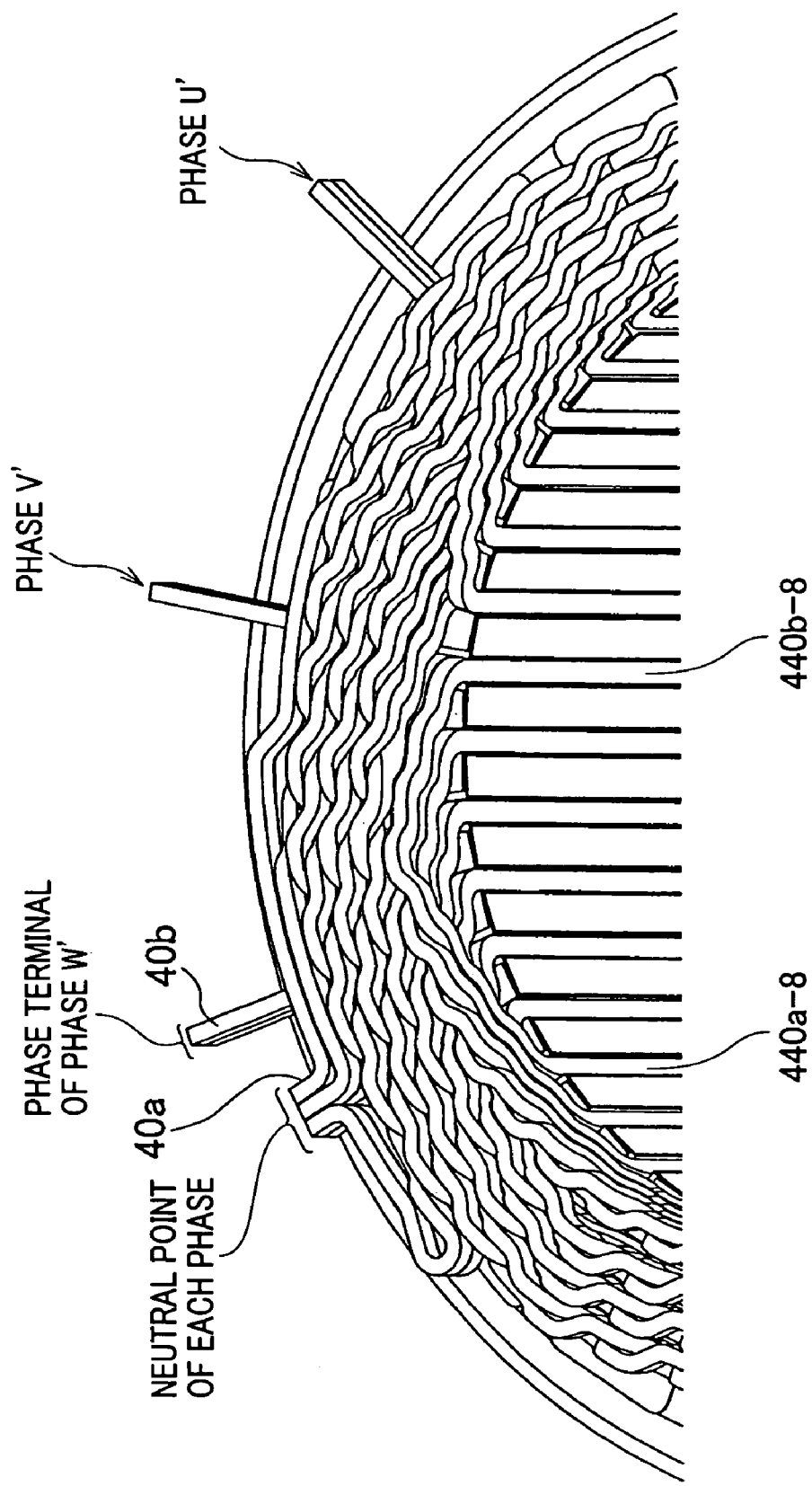
FIG. 13 is an illustration of turn portions of the stator, which are routed to pass radially outer side in the rotary electric machine according to the embodiment.
Figure 14:
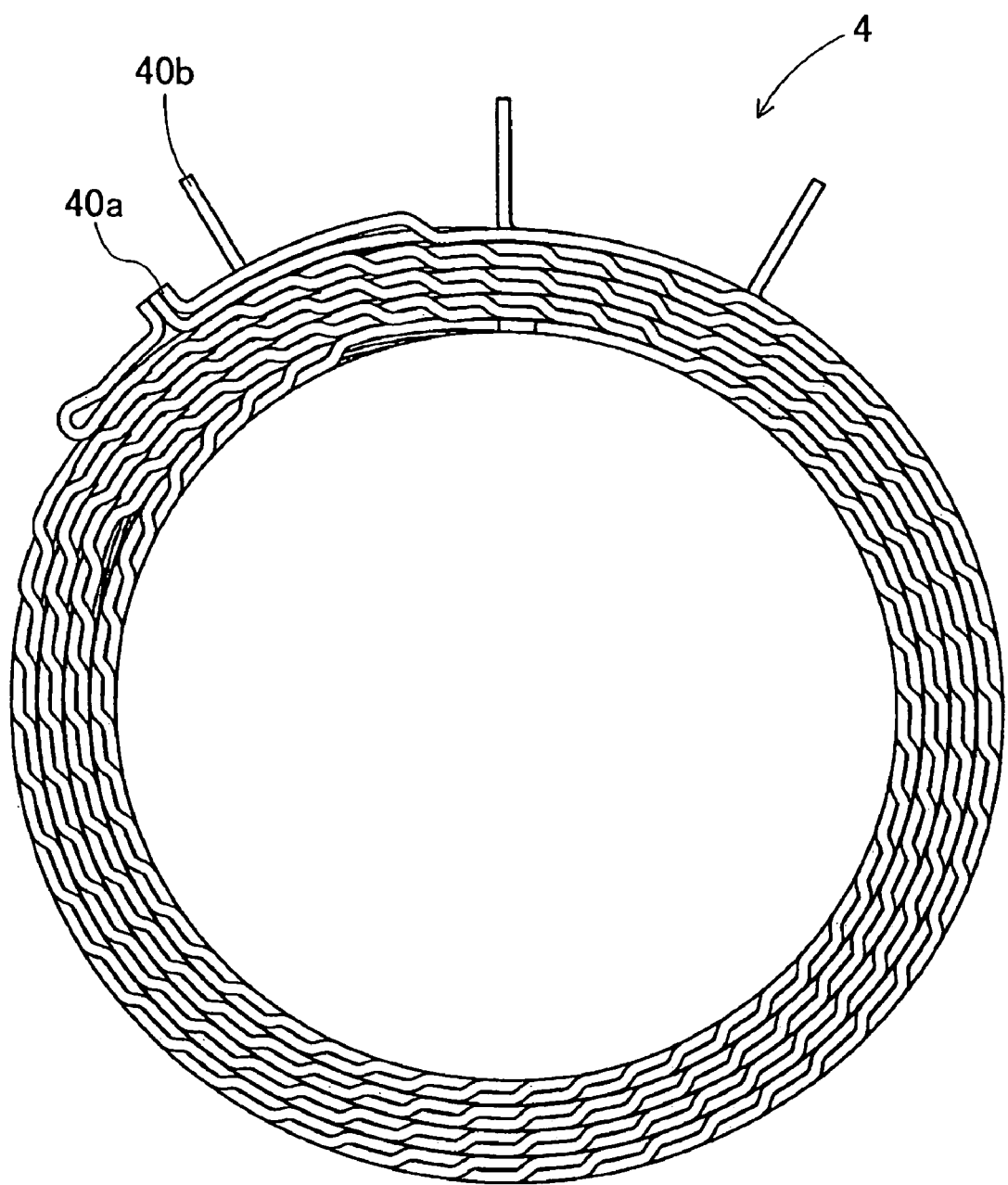
FIG. 14 is a top plan of the coil of the rotary electric machine according to the embodiment.

As shown in FIGS. 13 and 14, the turn portion 44VIII (top) of the $-4^{th}$ layer connects the slots 440*a*-8 and 440*b*-8 on the upper side of the stator core 30. The turn portion 44VIII (top) of the –4th layer and the turn portions 44VIII (top) of other layers that are circumferentially in the same position as the turn portion of the –4th layer, are offset radially outward to provide a coil end with an offset shape. Thus, the turn portion VIII (top) of the –4th layer, which connects the slots 440*a*-8 and 440*b*-8, no longer causes interference with other turn portions VIII (top). In addition, owing to this configuration, the coil end can be downsized. Also, as shown in FIG. 14, the wire members 40 are no longer projected radially inward from the inner peripheral surface of the coil 4, which faces the rotor 2.

COMPARATIVE EXAMPLE I

In the present and the subsequent comparative examples, the identical or similar components to those in the above embodiment are given the same reference numerals for the sake of omitting explanation.

Figure 15:
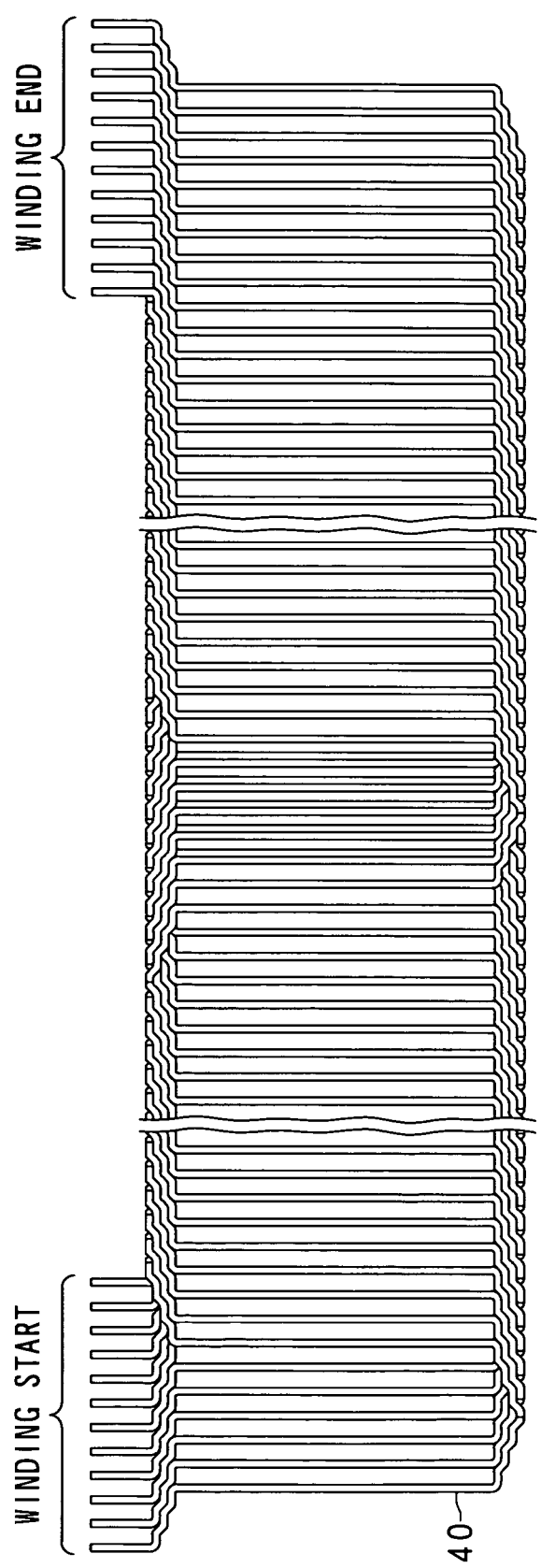
FIG. 15 is an illustration of a plastic body of stator windings forming a coil in a rotary electric machine according a comparative example.
Figure 16:
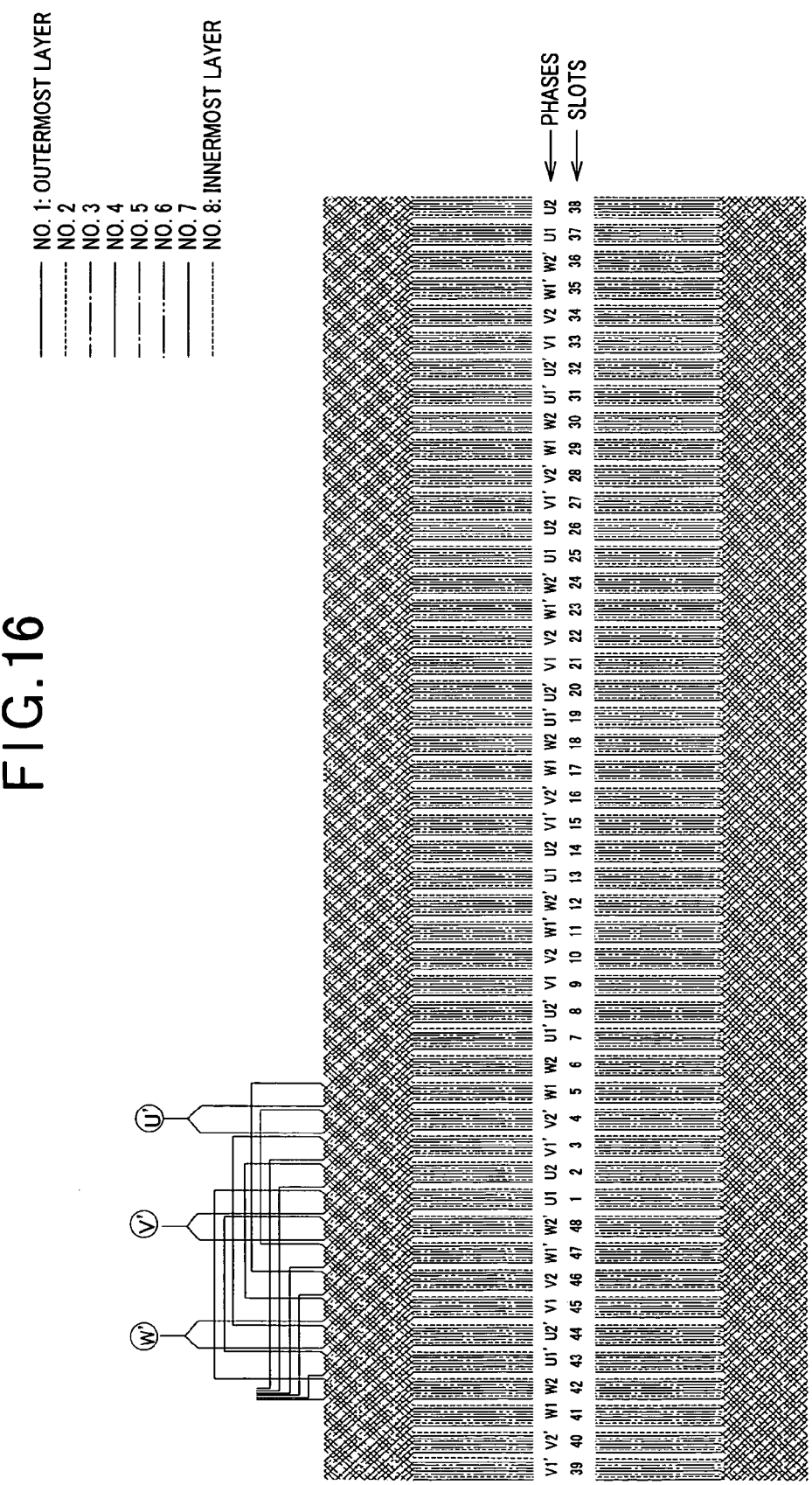
FIG. 16 is an illustration of wire connection of phase windings of the coil in the rotary electric machine according to the comparative example.
Figure 17:
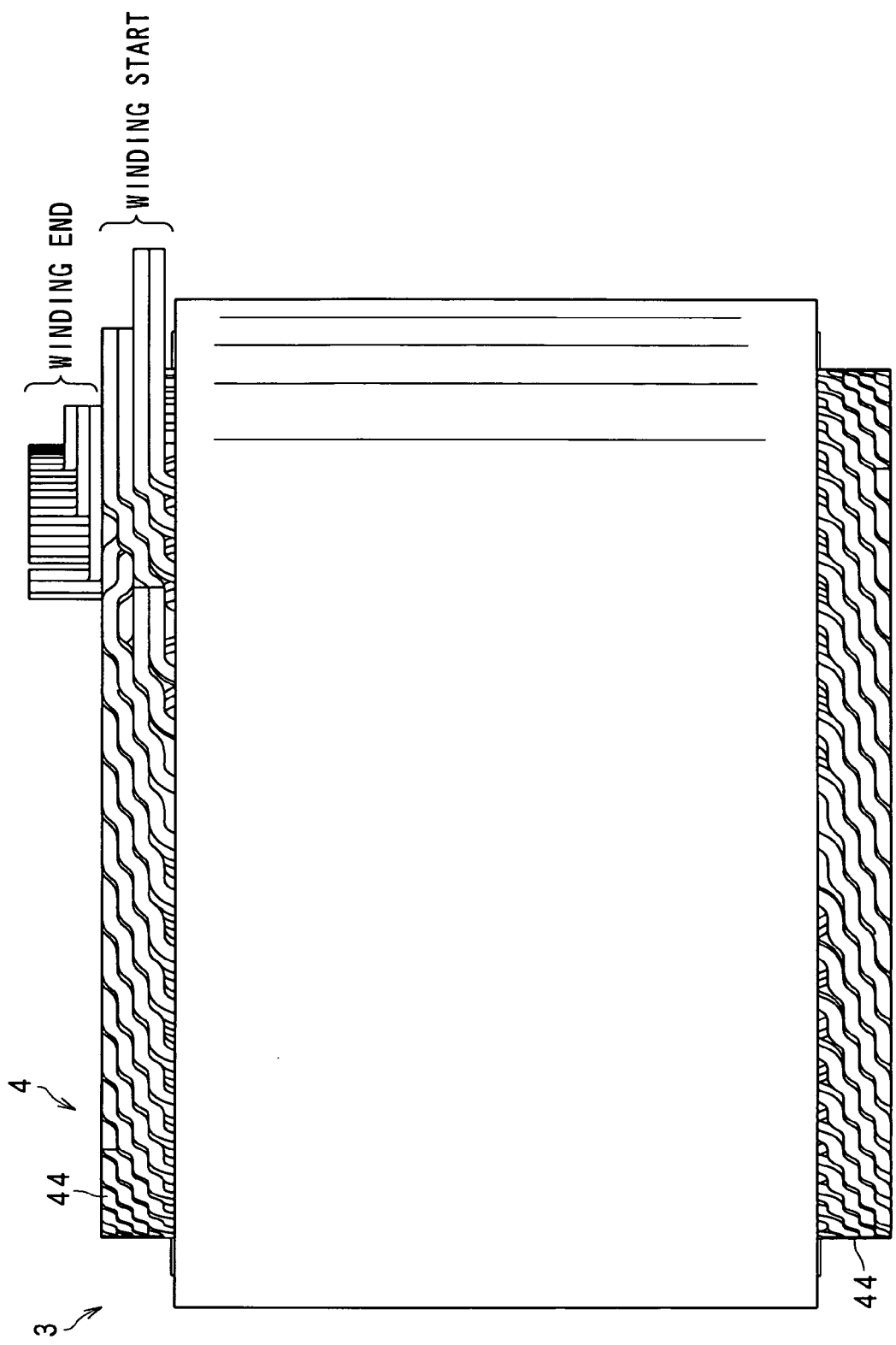
FIG. 17 is a side elevation of the stator in the rotary electric machine according to the comparative example.

In the embodiment described above, the two wire members 40*a*, 40*b* forming the connected winding member and arranged in the same phase are connected to each other. On the other hand, the coil 4 of the present comparative example is formed using the wire members which are not connected to each other. FIGS. 15 to 17 show a method of winding such wire members of the present comparative example.

As shown in a development of FIG. 15, one ends and the other ends (winding-start ends and winding-end ends) of the wire members 40 configuring the coil 4 are located on the sides of both surfaces, i.e. on the sides of the inner and outer peripheral surfaces, respectively, of the coil 4. In order to establish connection of the end (winding-end end) of each wire member 40 at the innermost peripheral surface of the coil 4, it is necessary to route this end (winding-end end) crossing over the coil end.

As in the present comparative example, the larger number of the wire members 40 necessitates the routing of the winding-end ends to be cumbersome, and thus the cost for manufacturing the coil 4 will be much increased. FIG. 16 shows an example of routing the winding-end ends. The connecting method of each of the wire members used in FIG. 16 is the same as the one used in FIG. 8.

Further, as shown in FIG. 17, permitting the winding-end ends to project from the innermost layer (position "No. 8" of the associated slots) of the coil 4 necessitates the winding-end ends to cross over the coil end, for connection. As a result of the routing of these winding-end ends, the size of the coil end is increased to increase the size of the entire coil.

In this regard, in the stator 3 of the rotary electric machine 1 according to the embodiment described previously, the two wire members (connected wire bodies) 40*a*, 40*b* configuring the coil 4 are connected to each other at the return portion 46. This can provide a configuration in which each winding-end end of the couple of the two wire members 40*a*, 40*b* is prevented from projecting from the coil end. In other words, the stator 3 of the rotary electric machine 1 according to the above embodiment is configured to reduce the size of the coil 4.

COMPARATIVE EXAMPLE II

The above embodiment is configured in such a way that the coil end is radially and outwardly offset at the turn portions 44VIII (top) of the individual layers, which are located at the same circumferential position as the turn portion 44VIII (top) of the $-4^{th}$ layer to impart the coil end with an offset shape. In the present comparative example however, the coil end does not have this offset shape.

Figure 18:
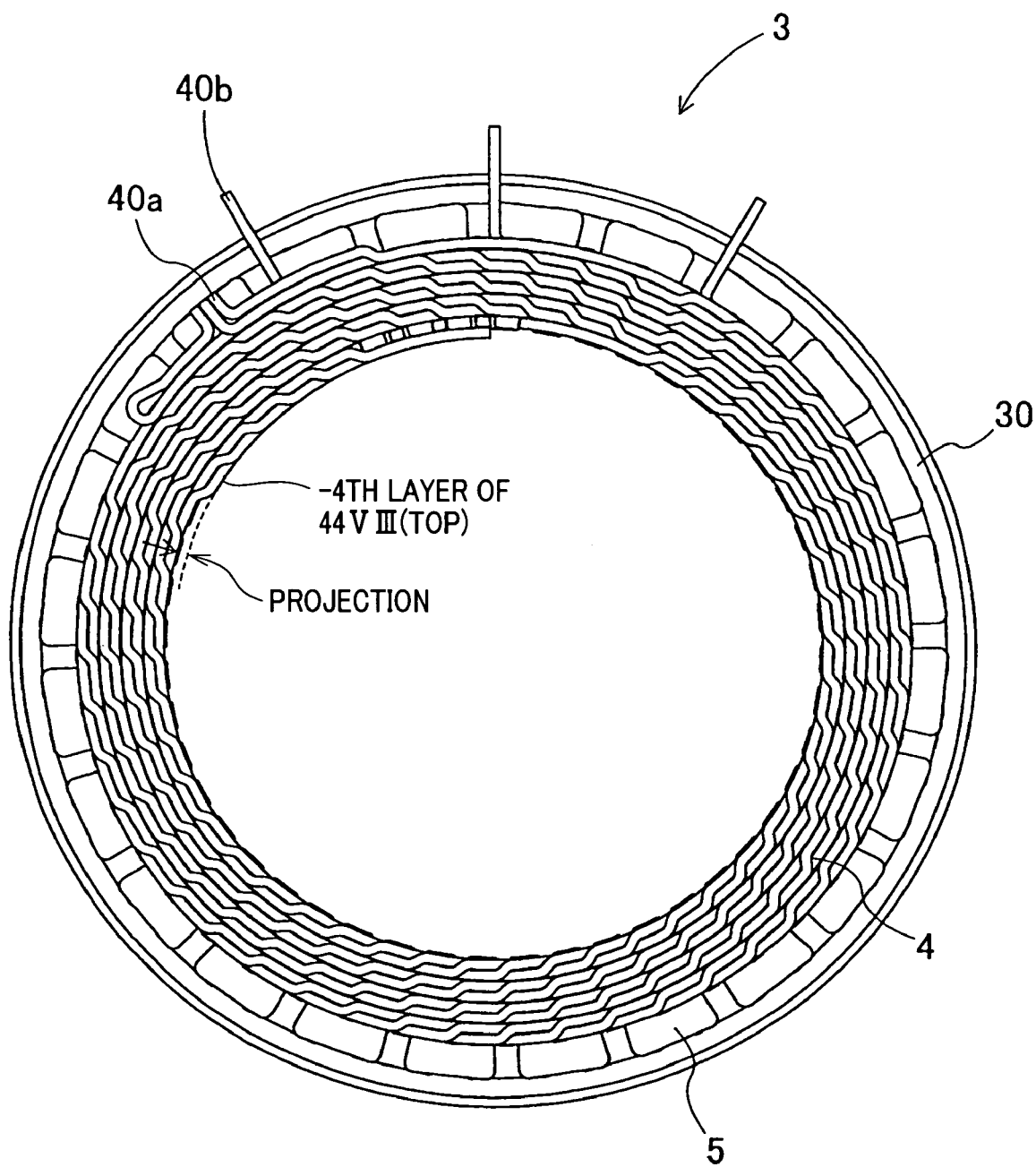
FIG. 18 is a top plan of a stator of a rotary electric machine according to another comparative example.

FIG. 18 is a top plan of the stator 3 according to the present comparative example. In the present comparative example, the wire member is wound in such a way that each turn portion 44VIII (top) will not pass by way of a radial position more outward than the radial position of the turn portion 44VIII per se. Accordingly, the turn portion 44VIII (top) of the $-4^{th}$ layer, which is positioned at the innermost peripheral side is projected from the inner peripheral surface of the coil 4. A stator having such a configuration may make it difficult to assemble the rotor 2 therein.

In this regard, the above embodiment is configured in such a way that the wire member 40 will not be projected radially inward from the inner peripheral surface of the coil 4 to prevent interference between the coil 4 and the rotor 2.

As described above, the stator 3 of the rotary electric machine 1 according to the above embodiment is configured to reduce its size without deteriorating the good performance.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A stator for a multiple-phase rotary electric machine, the stator facing a rotor, the stator comprising:
   a stator core formed into a cylinder having an axial direction, a radial direction, and a circumferential direction and formed to have a plurality of slots each extending in the axial direction and arranged in the circumferential direction; and
   a coil formed of a plurality of windings for individual phases of the rotary electric machine, the windings being wound in and around the plurality of slots such that the windings are wound in a waveform in the circumferential direction, the winding for each phase consisting of two windings electrically connected to each other,
   wherein the winding for each phase has a plurality of slot-accommodated portions accommodated respectively in slots designated therefor among said plurality of slots and a plurality of turn portions each connecting mutually adjacently located two of the slot-accommodated portions thereof, outside of the slots on both sides of the stator core in the axial direction, the slot-accommodated portions including a return portion that connects two of the turn portions so that the winding for each phase returns a winding direction thereof in the circumferential direction,
   wherein the winding for each phase has a first winding and a second winding electrically connected in series to each other, the slot-accommodated portions of the first and second windings being alternately stacked in each of said slots designated therefor in the radial direction, the designated slots being located every predetermined number of slots among the plurality of slots in the circumferential direction,
   the return portion of the winding for each phase has opposite ends thereof connected to the two turn portions, respectively, one of the two turn portions, which is connected to one end of the return portion, being connected to one mutually adjacently located slot-accommodated portion accommodated at the same level as an in-slot level of the return portion in the radial direction, and the other of the two turn portions, which is connected to the other end of the return portion, being connected to another mutually adjacently located slot-accommodated portion accommodated at a different level from the in-slot level of the return portion in the radial direction, and
   the turn portions include remaining turn portions which are at a same circumferential position as the turn portion connected to the one end of the return portion, the remaining turn portions being arranged outside one of the axial ends of the stator core so as to be shifted farther, in a direction departing from the rotor in the radial direction, than in-slot stacked positions of the slot-accommodated portions connected to the remaining turn portions.

2. The stator of claim 1, wherein the return portion is located, in the radial direction, at a position corresponding to an innermost position of the slot in which the mutually adjacently located slot-accommodated portion connected to the one end of the return portion is accommodated, and the remaining turn portions are connected to slot-accommodated portions other than the mutually adjacently located slot-accommodated portion connected to the one end of the return portion.

3. The stator of claim 2, wherein the windings include a connection realizing an electrical neutral point at which the windings for the respective phases are connected, the connection is lead out at said one of the axial ends of the stator core.

4. The stator of claim 3, wherein the winding for each of the phases composed of a wire member comprising a metal conductor whose section shape across a length-wise direction thereof is substantially rectangular and an insulative resin film covering the conductor.

5. The stator of claim 4, wherein each of the turn portions is cranked in the circumferential direction.

6. The stator of claim 5, wherein each of the turn portions is shaped into a staircase form whose circumferential central part is protruded from one of the axial ends of the stator core and is the highest in the axial direction.

7. The stator of claim 6, wherein the central part has a height corresponding to a thickness of each of the windings.

8. The stator of claim 7, wherein the slot-accommodated portions of each of the windings are stacked on one another in each of the slots designated therefor in the radial direction.

9. The stator of claim 8, wherein the winding for each phase has both ends located at an outermost position of the slots in the radial direction, and both of the ends of the winding for each phase are positioned lower than a height of the turn portions in the radial direction.

10. The stator of claim 4, wherein each of the turn portions is shaped into a staircase form whose circumferential central part is protruded from the axial ends of the stator core and is the highest in the axial direction.

11. The stator of claim 10, wherein the central part has a height corresponding to a thickness of each of the windings.

12. The stator of claim 11, wherein the slot-accommodated portions of each of the windings are stacked on one another in each of the slots designated therefor in the radial direction.

13. The stator of claim 12, wherein each of the windings has both ends located at an outermost position of the slots in the radial direction, and both ends of the winding for each phase are positioned lower than a height of the turn portions in the radial direction.

14. The stator of claim 3, wherein each of the turn portions is cranked in the circumferential direction.

15. The stator of claim 3, wherein each of the turn portions is shaped into a staircase form whose circumferential central part is protruded from the axial ends of the stator core and is the highest in the axial direction.

16. The stator of claim 15, wherein the central part has a height corresponding to a thickness of each of the windings.

17. The stator of claim 3, wherein the slot-accommodated portions of each of the windings are stacked on one another in each of the slots designated therefor in the radial direction.

18. The stator of claim 3, wherein each of the windings has both ends located at an outermost position of the slots in the radial direction, and both ends of the winding for each phase are positioned lower than a height of the turn portions in the radial direction.

19. A rotary electric machine comprising:
a rotor; and
a stator having multiple phases and facing the rotor,
wherein the stator comprises:
a stator core formed into a cylinder having an axial direction, a radial direction, and a circumferential direction and formed to have a plurality of slots each extending in the axial direction and arranged in the circumferential direction; and
a coil formed of a plurality of windings for individual phases of the machine, the windings being wound in and around the respective plurality of slots,
wherein the winding for each phase has a plurality of slot-accommodated portions accommodated respectively in slots designated therefor among said plurality of slots and a plurality of turn portions each connecting mutually adjacently located two of the slot-accommodated portions thereof, outside of the slots in the axial direction, the slot-accommodated portions including a return portion that connects two of the turn portions so that the winding for each phase returns a winding direction thereof in the circumferential direction, wherein the winding for each phase has a first winding and a second winding electrically connected in series to each other, the slot-accommodated portions of the first and second windings being alternately stacked in each of said slots designated therefor in the radial direction, the designated slots being located every predetermined number of slots among the plurality slots in the circumferential direction,
the return portion of the winding for each phase has a joined portion having both ends connected to the two turn portions, respectively, one of the two turn portions, which is connected to one end of the return portion, being connected to one mutually adjacently located slot-accommodated portion accommodated at the same level as an in-slot level of the return portion in the radial direction, and the other of the two turn portions, which is connected to the other end of the return portion, being connected to another mutually adjacently located slot-accommodated portion accommodated at a different level from the in-slot level of the return portion in the radial direction, and
the turn portions include remaining turn portions which are at a same circumferential position as the turn portion connected to the one end of the return portion, the remaining turn portions being arranged outside one of the axial ends of the stator core so as to be shifted farther, in a direction departing from the rotor in the radial direction, than in-slot stacked positions of slot-accommodated portions connected to the remaining turn portions, and
wherein the rotor is provided with N and S magnetic poles arranged alternately in the circumferential direction and arranged to face the stator, the rotor being located either inside or outside of the stator in the radial direction.

20. The rotary electric machine of claim 19, wherein the return portion is located, in the radial direction, at an innermost position in the slot in which the slot-accommodated portion connected to the one of the ends of the return portion is accommodated and the remaining turn portions are connected to the slot-accommodated portions other than the slot-accommodated portion connected to the one of the ends of the return portion.

21. The rotary electric machine of claim 20, wherein the windings include a connection realizing an electrical neutral point at which the windings for the respective phases are connected, the connection is lead out at the one of both the axial ends of the stator core.

* * * * *